United States Patent
Nettles et al.

(10) Patent No.: US 7,337,032 B1
(45) Date of Patent: Feb. 26, 2008

(54) SCHEDULING AHEAD FOR VARIOUS PROCESSES

(75) Inventors: Steven C. Nettles, Johnson City, TX (US); Larry D. Barto, Austin, TX (US); Gustavo Mata, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 255 days.

(21) Appl. No.: 10/957,756

(22) Filed: Oct. 4, 2004

(51) Int. Cl.
*G06F 19/00* (2006.01)

(52) U.S. Cl. .................................. 700/100; 700/97

(58) Field of Classification Search ............ 700/97, 700/99, 100–103
See application file for complete search history.

(56) References Cited

U.S. PATENT DOCUMENTS

| | | | |
|---|---|---|---|
| 4,796,194 A | 1/1989 | Atherton | 364/468 |
| 5,093,794 A | 3/1992 | Howie et al. | 364/468 |
| 5,369,570 A | 11/1994 | Parad | 364/401 |
| 5,375,061 A | 12/1994 | Hara et al. | 364/468 |
| 5,444,632 A | 8/1995 | Kline et al. | 364/468 |
| 5,446,671 A | 8/1995 | Weaver et al. | 364/468 |
| 5,548,535 A | 8/1996 | Zvonar | 364/551.01 |
| 5,586,021 A | 12/1996 | Fargher et al. | 364/468.06 |
| 5,835,688 A | 11/1998 | Fromherz | 395/112 |
| 5,890,134 A | 3/1999 | Fox | 705/9 |
| 5,953,229 A | 9/1999 | Clark et al. | 364/468.06 |
| 6,038,539 A | 3/2000 | Maruyama et al. | 705/8 |
| 6,088,626 A | 7/2000 | Lilly et al. | 700/100 |
| 6,091,998 A | 7/2000 | Vasko et al. | 700/100 |
| 6,128,542 A | 10/2000 | Kristoff et al. | 700/97 |
| 6,148,239 A | 11/2000 | Funk et al. | 700/1 |
| 6,202,062 B1 | 3/2001 | Cameron et al. | 707/3 |
| 6,263,255 B1 | 7/2001 | Tan et al. | 700/121 |
| 6,356,797 B1 | 3/2002 | Hsieh et al. | 700/101 |
| 6,374,144 B1 | 4/2002 | Viviani et al. | 700/12 |
| 6,400,999 B1 | 6/2002 | Kashiyama et al. | 700/100 |
| 6,434,443 B1 | 8/2002 | Lin | 700/100 |
| 6,584,369 B2 | 6/2003 | Patel et al. | 700/100 |
| 7,286,999 B2 * | 10/2007 | Majd et al. | 705/8 |
| 2003/0158795 A1 * | 8/2003 | Markham et al. | 705/28 |
| 2006/0090165 A1 * | 4/2006 | Martin et al. | 719/318 |

OTHER PUBLICATIONS

International Search Report Dated Sep. 30, 2003 (PCT/US02/41777).

(Continued)

*Primary Examiner*—Zoila Cabrera
(74) *Attorney, Agent, or Firm*—Williams, Morgan & Amerson, P.C.

(57) ABSTRACT

A method and apparatus for scheduling ahead in a process flow for a manufacturing domain entity are disclosed. The method includes detecting an occurrence of a triggering event defined for a current process operation on the manufacturing domain entity; and scheduling the target process operation upon expiration of a timed offset from the detection of the triggering event responsive to the detection thereof, the timed offset being defined for the target process operation scheduling. In various aspects, the apparatus includes a program storage medium encoded with instructions that, when executed by a computing device, perform such a method and a computer programmed to perform such a method. In still other aspects, the apparatus includes a process flow implementing such a method.

57 Claims, 12 Drawing Sheets

OTHER PUBLICATIONS

International Search Report Dated Feb. 16, 2004 (PCT/US02/41659).
Resende, "Shop Floor Scheduling of Semiconductor Wafer Manufacturing," *University of California, Berkeley* (1987).
Glassey et al., "Closed-Loop Job Release Control for VLSI Circuit Manufacturing," *IEEE Transactions on Semiconductor Manufacturing* 1:36-46 (1988).
"Agent-Enhanced Manufacturing System Initiative," *Technologies for the Integration of Manufacturing Applications (TIMA)* (Oct. 1997).
TBD, Classification of Approach.
"Factory Integration," *The National Technology Roadmap for Semiconductors: Technology Needs* (1997).
SALSA Enhancements for next Swarm Release (Apr. 22, 1999).
SALSA Exceptions—Minutes from May 11, 1999.
Starvation Avoidance Lot Start Agent (SALSA) (Overview: Apr. 15, 1999).
Starvation Avoidance Lot Start Agent, *Fab25 AEMSI/SALSA Review Meeting* (May 26, 1999).
Starvation Avoidance Lot Start Agent, *Iteration 1 Requirements Kickoff* (May 3, 1999).
Van Parunak, "Review of Axtell and Epstein" (Jun. 23, 1999).
Baumgärtel et al., "Combining Multi-Agent Systems and Constraint Techniques in Production Logistics" (1996).
Bonvik et al., "Improving a Kanban Controlled Production Line Through Rapid Information Dissemination" (Jul. 10, 1995).
Burke et al., "The Distributed Asynchronous Scheduler," pp. 309-339.
Butler et al., "ADDYMS: Architecture for Distributed Dynamic Manufacturing Scheduling," pp. 199-213.
Fordyce et al., "Integrating Decision Technologies for Dispatch Scheduling in Semiconductor Manufacturing," *Logistics Management System (LMS)*, pp. 473-516.
Hynynen, "BOSS: An Artificially Intelligent System for Distributed Factory Scheduling," *Computer Applications in Production and Engineering*, pp. 667-677 (1989).
Interrante et al., "Emergent Agent-Based Scheduling of Manufacturing Systems".
Juba et al., "Production Improvements Using a Forward Scheduler".
Li et al., "Minimum Inventory Variability Schedule with Applications in Semiconductor Fabrication," *IEEE Transactions on Semiconductor Manufacturing* 9:145-149 (1996).
Lin et al., "Integrated Shop Floor Control Using Autonomous Agents," *IIE Transactions* 24:57-71 (1992).
Lu et al., "Efficient Scheduling Policies to Reduce Mean and Variance of Cycle-Time in Semiconductor Manufacturing Plants," *IEEE Transactions Semiconductor Manufacturing* 7:374-388 (1994).
Martin-Vega et al., "Applying Just-In-Time in a Wafer Fab: A Case Study," *IEEE Transactions on Semiconductor Manufacturing* 2:16-22 (1989).
Murthy et al., "Agent Based Cooperative Scheduling," pp. 112-117.
Van Parunak et al., "Agents Do It In Time—Experiences with Agent-Based Manufacturing Scheduling" (1999).
Van Parunak et al., "Agent-Based Models & Manufacturing Processes".
Ramos et al., "Scheduling Manufacturing Tasks Considering Due Dates: A New Method Based on Behaviours and Agendas".
Shen et al., "An Agent-Based Approach for Dynamic Manufacturing Scheduling".
Hollister, "Schedule Paper #17 Summary" (Jun. 23, 1999).
Hollister, "Schedule Paper #19 Summary" (Jun. 23, 1999).
Hollister, "Schedule Paper #23 Summary" (Jun. 23, 1999).
Hollister, "Schedule Paper #32 Summary" (Jun. 23, 1999).
Vaario et al., "An Emergent Modelling Method for Dynamic Scheduling," *Journal of Intelligent Manufacturing* 9:129-140 (1998).
Wellman et al., "Auction Protocols for Decentralized Scheduling" (May 22, 1998).
Weber, "Material Traceability—The Missing Link in TAP Systems," *Test, Assembly and Packaging Automation and Integration '99 Conference*.
"ObjectSpace Fab Solutions Semiconductor Product Development Overview" (presented at SEMICON Southwest 1998).
"Agent Enhanced Manufacturing Systems Initiative (AEMSI) Project" (presented by Dan Radin, ERIM CEC Nov. 12-13, 1998).
Weber, "APC Framework: Raising the Standard for Fab Automation and Integration," *Equipment Automation Conference 1st European Symposium on Semiconductor Manufacturing* (Apr. 14, 1999).
Wein, "Scheduling Semiconductor Wafer Fabrication," *IEEE Transactions on Semiconductor Manufacturing* 1:115-130 (1988).
Bonvik, "Performance Analysis of Manufacturing Systems Under Hybrid Control Policies" (Sep. 22, 1995).
Bonvik, "Performance Analysis of Manufacturing Systems Under Hybrid Control Policies" (Oct. 3, 1995).
Sikora et al., "Coordination Mechanisms for Multi-Agent Manufacturing Systems: Applications to Integrated Manufacturing Scheduling," *IEEE Transactions on Engineering Management* 44:175-187 (1997).
Sousa et al., "A Dynamic Scheduling Holon for Manufacturing Orders," *Journal of Intelligent Manufacturing* 9:107-112 (1998).
Upton et al., "Architectures and Auctions in Manufacturing," *Int. J. Computer Integrated Manufacturing* 4:23-33 (1991).
Fordyce et al., "Logistics Management System (LMS): An Advanced Decision Support System for the Fourth Decision Tier-Dispatch or Short Interval Scheduling,", pp. 1-58.
Gere, "Heuristics in Job Shop Scheduling," *Management Science* 13:167-190 (1966).
Ehteshami et al., "Trade-Offs in Cycle Time Management: Hot Lots," *IEEE Transactions on Semiconductor Manufacturing* 5:101-106 (1992).
Axtell et al., "Distributed Computation of Economic Equilibria via Bilateral Exchange" (Mar. 1997).

* cited by examiner

SCHEDULING AHEAD FOR VARIOUS PROCESSES

BACKGROUND OF THE INVENTION

1. Field of the Invention

This invention pertains to automated manufacturing environments, and, more particularly, to scheduling in an automated manufacturing environment employing agent-based scheduling and factory control.

2. Description of the Related Art

Growing technological requirements and the worldwide acceptance of sophisticated electronic devices have created an unprecedented demand for large-scale, complex, integrated circuits. Competition in the semiconductor industry requires that products be designed, manufactured, and marketed in the most efficient manner possible. This requires improvements in fabrication technology to keep pace with the rapid improvements in the electronics industry. Meeting these demands spawns many technological advances in materials and processing equipment and significantly increases the number of integrated circuit designs. These improvements also require effective utilization of computing resources and other highly sophisticated equipment to aid, not only design and fabrication, but also the scheduling, control, and automation of the manufacturing process.

Turning first to fabrication, integrated circuits, or microchips, are manufactured from modern semiconductor devices containing numerous structures or features, typically the size of a few micrometers. The fabrication process generally involves processing a number of wafers through a series of fabrication tools. Layers of materials are added to, removed from, and/or treated on a semiconducting substrate during fabrication to create the integrated circuits. The fabrication essentially comprises the following four basic operations: layering, or adding thin layers of various materials to a wafer from which a semiconductor is produced; patterning, or removing selected portions of added layers; doping, or placing specific amounts of dopants in selected portions of the wafer through openings in the added layers; and heat treating, or heating and cooling the materials to produce desired effects in the processed wafer.

Although there are only four basic operations, they can be combined in hundreds of different ways, depending upon the particular fabrication process. See, e.g., Peter Van Zant, *Microchip Fabrication A Practical Guide to Semiconductor Processing* (3d Ed. 1997 McGraw-Hill Companies, Inc.) (ISBN 0-07-067250-4). Each fabrication tool performs one or more of four basic operations. The four basic operations are performed in accordance with an overall process to finally produce the finished semiconductor devices.

Controlling a semiconductor factory fabricating such integrated circuits, however, is a challenging task. A semiconductor factory ("fab") is a complex environment where numerous parts, typically 40,000 wafers or more, and numerous part types, typically 100 part types or more, are simultaneously being manufactured. As each wafer moves through the semiconductor factory (or, "fab"), it may undergo more than 300 processing steps, many of which use the same machines. A large factory may contain approximately 500 computer-controlled machines to perform this wafer processing. Routing, scheduling, and tracking material through the fab is a difficult and complicated task, even with the assistance of a computerized factory control system.

Efficient management of a facility for manufacturing products such as semiconductor chips requires monitoring various aspects of the manufacturing process. For example, it is typically desirable to track the amount of raw materials on hand, the status of work-in-process ("WIP") and the status and availability of machines and tools at every step in the process. One of the most important decisions is selecting which lot should run on each machine at any given time. Additionally, most machines used in the manufacturing process require scheduling of routine preventative maintenance ("PM") and equipment qualification ("Qual") procedures, as well as other diagnostic and reconditioning procedures that must be performed on a regular basis. These procedures should be performed such that they do not impede the manufacturing process itself.

One approach to this issue implements an automated "Manufacturing Execution System" ("MES"). An automated MES enables a user to view and manipulate, to a limited extent, the status of machines and tools, or "entities," in a manufacturing environment. In addition, an MES permits dispatching and tracking of lots or work-in-process through the manufacturing process to enable resources to be managed in the most efficient manner. Specifically, in response to MES prompts, a user inputs requested information regarding work-in-process and entity status. For example, when a user performs a PM on a particular entity, the operator logs the performance of the PM (an "event") into an MES screen to update the information stored in the MES database with respect to the status of that entity. Alternatively, if an entity is to be put down for repair or maintenance, the operator will log this information into the MES database, which then prevents use of the entity until it is subsequently logged back up to a production ready state. Exemplary MESes include WORKSTREAM™, a product of Applied Materials, Inc., or SiView™, a product of International Business Machines, Inc. ("IBM").

Although MES systems are sufficient for tracking lots and machines, such systems suffer several deficiencies, the most obvious of which are their passive nature, lack of advance scheduling and inability to support highly automated factory operations. Current MES systems largely depend on manufacturing personnel for monitoring factory state and initiating activities at the correct time. For example, a lot does not begin processing until a wafer fab technician ("WFT") issues the appropriate MES command. And, prior to processing, a WFT must issue an MES command to retrieve the lot from the automated material handling system ("AMHS") with sufficient advance planning that the lot is available at the machine when the machine becomes available. If the WFT does not retrieve the lot soon enough, or neglects to initiate processing at the earliest available time, the machine becomes idle and production is adversely impacted.

These types of deficiencies in the typical automated MES emphasize the importance of the WFT in the efficient operation of the manufacturing process. WFTs perform many vital functions. For instance, WFTs initiate dispatching, transport, and processing as their attention and time permits. They make scheduling decisions such as whether to run an incomplete batch, as opposed to waiting for additional approaching lots, or performing PM or qualification procedures instead of processing lots. WFTs perform non-value added MES transactions and utilize conventional factory control systems that are passive. In this context, the term "passive" means activities in the control system must be initiated by the WFT, as opposed to being self-starting or self-initiating.

However, the presence of WFTs also inevitably introduces some inefficiencies. There typically is a large difference between the performance of the best WFT and the performance of the worst WFT. A WFT typically simultaneously monitors the processing of multiple tools and lots, making it difficult to focus on an individual lot or tool. Furthermore, the size and complexity of the modern fabrication process flows makes it exceedingly difficult for a WFT to foresee and prevent downstream bottlenecks or shortages arising from upstream activities. Shift changes, rest breaks, and days off for the WFT also create inefficiency or machine idle time that adversely impact the manufacturing process flow. Just as the importance of the WFT is magnified by the deficiencies of the automated MES, so are the inefficiencies of the WFT magnified by his importance.

Thus, factory control systems utilized in today's wafer fabs are passive and do not enable a high degree of automation. These systems are very dependent on WFTs and other factory staff to monitor the state of the factory, to continuously react to change, to make rapid logistical decisions, and to initiate and coordinate factory control activity in a timely manner. These WFTs are agents, providing the active element that is lacking in factory control systems. As a result, factory effectiveness in the highly competitive semiconductor industry is quite dependent on the availability, productivity, skill level, and consistency of these human agents. WFTs must monitor and operate a number of tools located in various bays in a fab. They are forced to multiplex across tools, bays, material handling systems and a variety of factory control systems. As a fab's production ramps and more complex processes are introduced, it becomes more difficult to meet the increased complexity and volume without increasing staff or system capabilities. WFTs visibility of upstream and downstream operations, tool state, work-in-process, and resource availability is limited.

However, key logistical decisions are frequently based on this limited and dated information, which is only partially provided by factory control systems. WFTs spend a significant amount of time interacting with systems, monitoring factory events and state changes, and performing other non-value added functions, such as MES logging. Shift changes disrupt the operation of the fab as the technicians are temporarily unable to provide required monitoring and coordination. Despite the best efforts of the technicians, utilization of tools suffers, adversely impacting other key factory metrics including cycle time, inventory levels, factory output and mix. With the need for intrabay material handling to transport 12-inch wafers in new 300 mm wafer fabs, significant additional complexity is introduced. Conventional factory control systems are not capable of providing this level of detailed scheduling and execution control.

The present invention is directed to resolving, or at least reducing, one or all of the problems mentioned above.

SUMMARY OF THE INVENTION

The invention includes, in its various embodiments and aspects, a method and apparatus for scheduling ahead in a process flow for a manufacturing domain entity. The method comprises detecting an occurrence of a triggering event defined for a current process operation on the manufacturing domain entity; and scheduling the target process operation upon expiration of a timed offset from the detection of the triggering event responsive to the detection thereof, the timed offset being defined for the target process operation scheduling. In various aspects, the invention includes a program storage medium encoded with instructions that, when executed by a computing device, perform such a method and a computer programmed to perform such a method. In still other aspects, the invention includes a process flow implementing such a method.

BRIEF DESCRIPTION OF THE DRAWINGS

The invention may be understood by reference to the following description taken in conjunction with the accompanying drawings, in which like reference numerals identify like elements, and in which.

Figure 1:
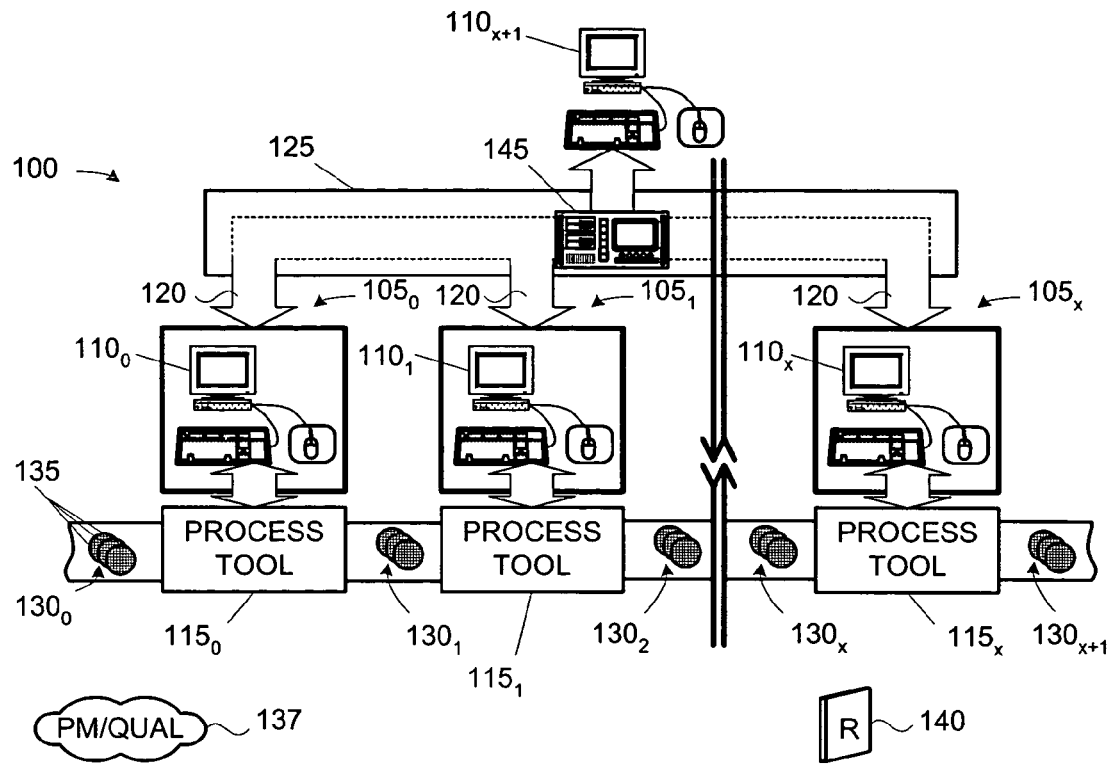
FIG. 1 conceptually depicts a portion of one particular embodiment of a process flow constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 conceptually illustrates a portion of one particular embodiment of a process flow 100 constructed and operated in accordance with the present invention. The process flow 100 fabricates semiconductor devices. However, the invention may be applied to other types of manufacturing processes. Thus, in the process flow 100 discussed above, the lots 130 of wafers 135 may more generically referred to as "work pieces." The process tools 115 and any process operation performed thereon need not necessarily be related to the manufacture of semiconductor devices in all embodiments. However, for the sake of clarity and to further an understanding of the invention, the terminology pertaining to semiconductor fabrication shall be retained in disclosing the invention in the context of the illustrated embodiments.

The illustrated portion of the process flow 100 includes a plurality of processing stations $105_0$-$105_x$, each station $105_0$-$105_x$ including a respective computing device $110_0$-$110_x$ communicating with a respective process tool $115_0$-$115_x$. The processing stations $105_0$-$105_x$ communicate with one another over communications links 120. In the illustrated embodiment, the computing devices device $110_0$-$110_x$ and the communications links 120 comprise a portion of a larger computing system 125. The process tools $115_0$-$115_x$ are shown in FIG. 1 processing lots $130_0$-$130_{x+1}$ of wafers 135 that will eventually become integrated circuit devices. The processing tools 115 and lots 130, as will be discussed more fully below, may more generally be referred to as "manufacturing domain entities."

In general, each of the process tools 115 performs some process operation on the lots 130. The process operation will be implementation specific, depending on the process flow and the end product of the manufacturing process. In the illustrated embodiment, for example, individual process stations 115 might layer, pattern, dope, or heat treat the wafers 135 of the lots 130, or some combination of these things. Or, the process stations 115 might perform some evaluation of the process operations performed by other process stations 115. Either way, the process flow 100 comprises the process operations performed by the process stations 115 on the lots 130.

Each lot 130 proceeds through the process flow 100 as part of its manufacture. Consider the lot $130_0$, which must undergo the current process operation on the process tool $115_0$, and the immediately successive process operation on the process tool $115_1$, and other process operations on other successive process tools (e.g., the process tool $115_x$). The process flow 100 is under software-implemented control, discussed more fully below, that generally "schedules ahead" of the present process operation in the illustrated embodiment. More particularly, the control software schedules "appointments" on behalf of, for example, lots 130 and process tools 115 for the process tools 115 to perform process operations on the lots 130. The control software typically attempts to schedule these appointments in advance of completing the current process operation, although sometimes exceptions do occur.

Figure 2:
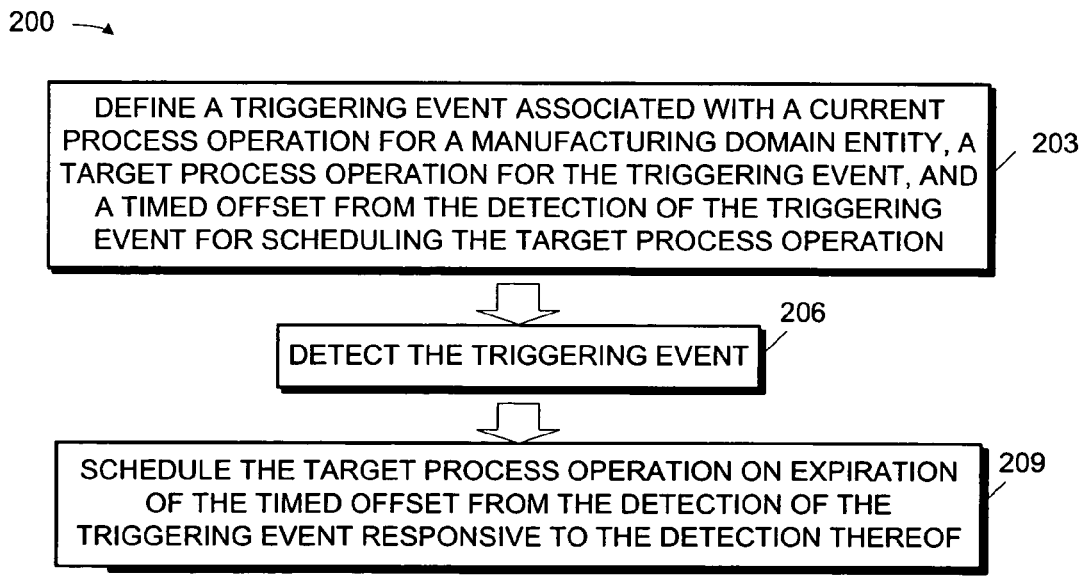
FIG. 2 illustrates one particular embodiment of a method in accordance with one aspect of the present invention.

In accordance with the present invention, and as illustrated in FIG. 2, a method 200 is implemented to increase the level of automation in the process flow 100 and to improve the efficiency of its operation. The method 200 is particularly useful in the context of "scheduling ahead," described above. In general, the method 200 provides a timing mechanism for scheduling a target process operation in the process flow 100 at some point subsequent to a current process operation. The method 200 seeks to begin scheduling the target process operation at some point in the current operation process or at some point relative to the current operation process. That point is primarily a function of a triggering event associated with the current process operation and a timed offset. Note that the method 200 does not necessarily result in "scheduling ahead" in all instances, although this is generally the goal of this particular implementation.

Referring now to FIG. 2, the method 200 begins by first defining (at 203) a triggering event associated with the current process operation for a manufacturing domain entity, the target process operation to be scheduled, and a timed offset from the detection of the triggering event for scheduling the target process operation. Consider, for instance, the process flow 100 in FIG. 1. To schedule the lot $130_0$ for a target process operation on the process tool $115_1$, a triggering event associated with the current process operation on the process tool $115_0$ is determined, along with an offset relative to that triggering event.

The actual determination of the triggering event and the offset will be implementation specific. Typically, what will be a triggering event and the associated offset for any given process operation will be made a prior, and is based on a number of factors. Since the determination is made a priori, it is typically separate from the operation of the process flow 100. However, some embodiments may determine the triggering events dynamically, e.g., responsive to factory metrics, and so the determination may be a part of the operation of the process flow 100 in these embodiments.

For instance, assume the process tool $115_1$ has a very high utilization such that it will be difficult for the lot $130_0$ to schedule an appointment for its services. In that case, it will be desirable to begin scheduling that appointment very early and the triggering event could be the start of the current process operation and the timed offset could be very small. Now, assume that the process tool $115_1$ has a very low utilization such that it will be very easy to schedule the appointment. It may be advantageous to wait until well into the current process operation to begin scheduling the target process operation. The triggering event may still be the start of the current processing operation, but the timed offset will be relatively longer. Or, the triggering event may be some point when the current process operation is nearing completion coupled with a relatively shorter timed offset. In the default case of the illustrated embodiment, transition of the current process operation into a state of "near complete" triggers the scheduling of the next successive process operation as the target with a zero time offset.

In the preceding example, the triggering event is implicitly defined as some state of the current process operation. However, the invention is not so limited. Alternative embodiments may employ different kinds of triggering events in addition to or in lieu of the state of the current process operation. Equipment events and factory state events, for example, may also be defined as triggering events in alternative embodiments.

In the illustrated embodiment, a given target process operation will have only one triggering event for the current process operation. This constraint is imposed as a convenient mechanism to help limit the computational burden by restricting the number of times that a given appointment will be scheduled. However, other mechanisms may be employed. For instance, an entry may be made in a look-up table when an appointment is scheduled such that, if a second trigger occurs, the look-up table can be consulted to determine if the appointment has already been scheduled. Thus, in alternative embodiments, the scheduling of a given target process operation might be prompted by more than one triggering event.

The illustrated embodiment also only employs the case where a single target process operation is triggered by a single triggering event. However, the invention is not so limited. Alternative embodiments may schedule multiple target process operations responsive to a single triggering event. For example, when a current process operation transitions into a "near complete" state, scheduling for two different target process operations might be triggered. A given current process operation may also give rise to multiple triggering events, each associated with one or multiple target process operations. Alternative embodiments may also employ combinations of these variations, as well as variations on these lines not expressly set forth herein.

Referring again to both FIG. 1 and FIG. 2, the method 200 proceeds by detecting (at 206, in FIG. 2) the triggering event. In general, this involves detecting that an event has occurred and determining that the detected event is a triggering event. In the illustrated embodiment, the software-implemented control of the process flow 100 employs a network of "listeners" and "notifiers," not shown in FIG. 1 and described further below, to detect the occurrence of events, which are broadcast by the various manufacturing domain entities. The other manufacturing domain entities subscribe to the network of listeners and notifiers for notification when selected events occur. In the illustrated embodiment, the determination of whether a detected event is, in fact, a triggering event inheres from the subscription to the network of listeners and notifiers.

The method 200 then schedules (at 209, in FIG. 2) the target process operation on expiration of the timed offset from the detection of the triggering event responsive to the detection thereof. The manner in which the scheduling is implemented is not material to the practice of the invention. A variety of scheduling techniques are known to the art, and any suitable scheduling technique may be employed. The illustrated embodiment employs one particular scheduling technique disclosed more fully below. Note that the scheduling begins at the time offset from the detection of the triggering event, and so there will be a mechanism for tracking the time elapsed since the triggering event was detected. In the illustrated embodiment, an alarm is set for the expiration of the time offset when the triggering event is detected. When the alarm goes off, the timer offset has expired and scheduling begins. Note further that the timed offset will typically be non-zero, but may also be zero in some limited circumstances.

The discussion above discloses the method 200, shown in FIG. 2, in a scenario in which the method 200 is employed to schedule the immediately successive process operation. More particularly, the lot $130_0$ is scheduled for a successive process operation on the process tool $115_1$ while undergoing a current process operation on the process tool $115_0$. However, the invention is not so limited. The invention may be employed to schedule a target process operation from further downstream in the process flow 100. For instance, the method 200 may be employed to schedule the lot $130_0$ for a process operation on the process tool $115_x$ while undergoing the current process operation on the process tool $115_0$. Note that the immediately successive process operation on the process tool $115_1$ must at some point be scheduled to occur prior to the target process operation on the process tool $115_x$.

Furthermore, the target process operations also need not be scheduled in the order in which they will be executed. Still referring to FIG. 1, the lot $130_0$ will undergo process operations on each of the process tools $115_0$-$115_x$ to traverse the process flow 100. Consider again the scenario in which the process tool $115_x$ is a "bottleneck" in the process flow 100. That is, the process tool $115_x$ is so highly utilized that the lots 130 have difficulty scheduling appointments for its services and have a tendency to backlog while they wait. Conversely, the process tool $115_1$ is lightly utilized and appointments are easily had.

Accordingly, the lot $130_0$ might wish to begin scheduling an appointment on the process tool $115_x$ well before it begins scheduling for an appointment on the process tool $115_1$. The flexibility in defining triggering events and timed offsets (at 203, in FIG. 2) facilitates this scenario. For instance, the difference in scheduling lead time can be effected by selection of the triggering events. The triggering event for scheduling on the process tool $115_x$ might be the start of the current process operation whereas the triggering event for scheduling on the process tool $115_1$ might be some point when the current process operation is nearing completion. The difference may also be effected by the determination of timed offsets. In this example, the same triggering event might be identified for scheduling on both the process tools $115_1$, $115_x$. The timed offset from the triggering event for scheduling on the process tool $115_x$, however, may be much shorter than that for scheduling on the process tool $115_1$. The difference can also be effected by a combination of these two approaches. Note, however, that the timing of scheduling efforts is driven by scheduling considerations.

The method 200, shown in FIG. 2, may also be applied iteratively as the lots 130 move through the process flow 100, shown in FIG. 1. As a lot 130 moves through the process flow 100, the method 200 is performed to schedule one or more future process operations, and it may schedule one or more future process operations ahead of where it is in the process flow 100. Note that a lot 130 need not necessarily have to schedule the immediately successive process operation at any given time if it has already been scheduled. Note also that scheduling efforts might be filtered on a number of characteristics, such as some attribute of the manufacturing domain entity. For instance, lots 130 having a higher priority than other lots 130 might be accorded earlier triggering events, or shorter timed offsets, or priority in scheduling.

Referring again to FIG. 1, the process flow 100 comprises more than just the lots 130 and the workstations 105 whose role in the process flow 100 may benefit from scheduling. For instance, a process tool 115 periodically undergoes periodic preventive maintenance ("PM") or qualification ("Qual") procedures, represented by the graphic 137. The frequency, number, and types of preventive maintenance procedures will vary by well known factors such as the type of the process tool 115, elapsed time since the last PM 137, and the extent of use. Although there generally are defined windows in which the PMs 137 should occur, it is generally desirable to schedule them so as to minimize any adverse impact on the process flow 100. Quals 137 are generally performed on reintroduction to the process flow 100 after a PM 137 or upon initial introduction into the process flow 100.

The process flow 100 may also employ the services of various resources 140, which is a reticle in the illustrated embodiment. For instance, a process tool 115 that is a stepper may employ a reticle that may be shared among several steppers. For a stepper to timely perform its process operation(s), the reticle has to be present in a timely fashion. Thus, the method 200 in FIG. 2 may be applied to the scheduling for not only the lots 130 and the process tools 115, but also to PMs/Quals 137 and resources 140 in the illustrated embodiment. Note that the resource 140 may also be, in alternative embodiments, e.g., machine loading resources, dummy wafers, cassettes, wafer fab technicians, maintenance technicians, etc.

Some of the manufacturing domain entities, e.g., the lots 130, are "consumers," i.e., they consume process services. Some of these manufacturing domain entities are "providers," i.e., they provide process services to be consumed. For instance, a process tool 115 represents a resource that may be consumed, e.g., process time, in the process flow 100. A process tool 115 may be a fabrication tool used to fabricate some portion of the wafers 135, i.e., layer, pattern, dope, or heat treat the wafers 135. Or, the process tool 115 may be a metrology tool used to evaluate the performance of various parts of the process flow 100. Note some manufacturing domain entities may sometimes be classed as a provider in one context and a consumer in another context, depending on their role in the process flow 100 at any given time.

Still referring to FIG. 1, as was mentioned above, the computing devices 110 may also be part of a larger computing system 125 by a connection over the communications links 120. Exemplary computing systems in such an implementation would include local area networks ("LANs"), wide area networks ("WANs"), system area networks ("SANs"), intranets, or even the Internet. The computing system 125 employs a networked client/server architecture, and thus includes one or more servers 145. However, alternative embodiments may employ a peer-to-peer architecture. Thus, in some alternative embodiments, the computing devices 110 may communicate directly with one another. The communications links 120 may be wireless, coaxial cable, optical fiber, or twisted wire pair links, for example. The computing system 125, in embodiments employing one, and the communications links 120 will be implementation specific and may be implemented in any suitable manner known to the art. The computing system 125 may employ any suitable communications protocol known to the art, e.g., Transmission Control Protocol/Internet Protocol ("TCP/IP").

Note that some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 3:
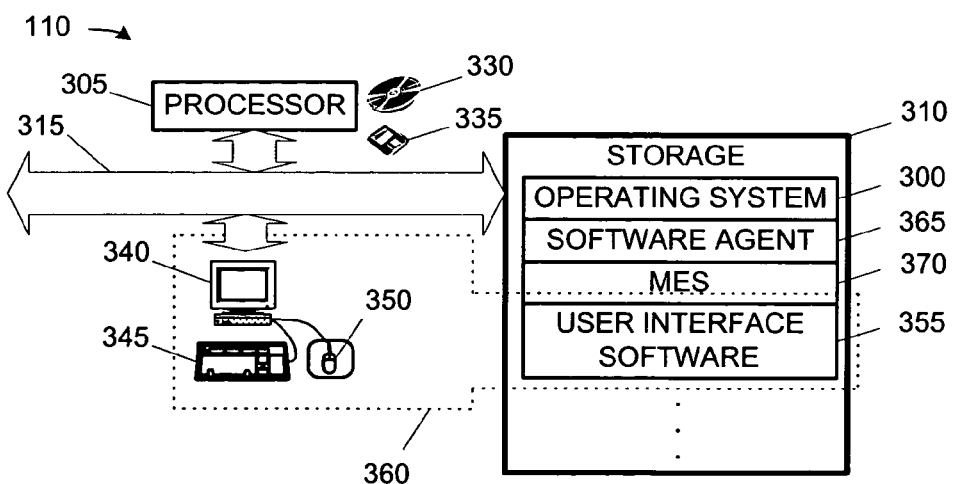
FIG. 3 conceptually depicts, in a partial block diagram, selected portions of the hardware and software architectures, respectively, of the computing devices in FIG. 1.

Thus, FIG. 3 depicts selected portions of the hardware and software architectures of the computing devices 110 programmed and operated in accordance with the present invention. Some aspects of the hardware and software architecture (e.g., the individual cards, the basic input/output system ("BIOS"), input/output drivers, etc.) are not shown. These aspects are omitted for the sake of clarity, and so as not to obscure the present invention. As will be appreciated by those of ordinary skill in the art having the benefit of this disclosure, however, the software and hardware architectures of the computing devices 110 will include many such routine features that are omitted from FIG. 3.

In the illustrated embodiment, the computing device 110 is a workstation, employing a UNIX-based operating system 300, although the invention is not so limited. The computing device 110 may be implemented in virtually any type of electronic computing device such as a notebook computer, a desktop computer, a mini-computer, a mainframe computer, or a supercomputer. The computing device 110 may even be, in some alternative embodiments, a processor or controller embedded in the process tool 115. The invention also is not limited to UNIX-based operating systems. Alternative operating systems (e.g., Windows™-based or disk operating system ("DOS")-based) may also be employed. The invention is not limited by these aspects of any particular implementation of the computing device 110.

The computing device 110 also includes a processor 305 communicating with storage 310 over a bus system 315. The storage 310 typically includes at least a hard disk (not shown) and random access memory ("RAM") (also not shown). The computing device 110 may also, in some embodiments, include removable storage such as an optical disk 330, or a floppy electromagnetic disk 335, or some other form, such as a magnetic tape (not shown) or a zip disk (not shown). The computing device 110 includes a monitor 340, keyboard 345, and a mouse 350, which together, along with their associated user interface software 355 comprise a user interface 360. The user interface 360 in the illustrated embodiment is a graphical user interface ("GUI"), although this is not necessary to the practice of the invention.

The processor 305 may be any suitable processor known to the art. For instance, the processor may be a general purpose microprocessor or a digital signal processor ("DSP"). In the illustrated embodiment, the processor 305 is an Athlon™ 64-bit processor commercially available from Advanced Micro Devices, Inc. ("AMD"), but the invention is not so limited. The 64-bit UltraSPARC™ or the 32-bit microSPARC™ from Sun Microsystems, any of the Itanium™ or Pentium™-class processors from Intel Corporation, and the Alpha™ processor from Compaq Computer Corporation might alternatively be employed.

Each computing device 110 may include, in the illustrated embodiment, a software agent 365 residing in the storage 310. Note that the software agents 365 may reside in the process flow 100 in places other than the computing devices 110. The situs of the software agent 365 is not material to the practice of the invention. Note also that, since the situs of the software agents 365 is not material, some computing devices 110 may have multiple software agents 365 residing thereon while other computing devices 110 may not have any. At least a portion of an automated MES 370 resides on at least one computing device 110.

Referring now to both FIG. 1 and FIG. 3, the software agents 365, collectively, are responsible for efficiently scheduling and controlling the lots 130 of wafers 135 through the fabrication process. A part of this responsibility includes implementing the method 200, shown in FIG. 2. The software agents 365 each represent some "manufacturing domain entity," e.g., a lot 130, a process tool 115. Thus, some of the software agents 365 represent the interests of consumers, e.g., the lots 130 or PM procedures (not shown), in advancing the lots 130 through the process flow 100 in a timely and efficient manner. Some of the software agents 365 represent the interests of providers, e.g., machines such as the process tool 115, in meeting the demands of consumers. As part of their responsibility, the software agents 365 negotiate among themselves for the allocation of those process services for subsequent processing of the lot 130 of wafers 135. The software agents 365 then allocate those services and, ultimately, the services are consumed as the lots 130 move through the process flow 100.

In the illustrated embodiment, the software agents 365 are intelligent, state aware, and imbued with specific goals for which they autonomously initiate behaviors to achieve. The software agents 365 are implemented as objects in an object oriented programming ("OOP") environment, but the invention may be implemented using techniques that are not object oriented. Their behavior is relatively simple and is influenced by scripts, rules and external properties. The behavior is designed to achieve selected goals such as achieving an assigned lot due date, achieving a predefined level of quality, maximizing machine utilization, and scheduling opportunistic preventive maintenance. In furtherance of these objectives, the software agents 365 interface with the MES 370 and are integrated with other existing factory control systems (not shown). As will be apparent to those skilled in the art having the benefit of this disclosure, the manner in which this interface and integration occurs is implementation specific, depending upon the makeup and configuration of the MES 370 and the factory control systems.

Collectively, the software agents 365 schedule ahead for each lot 130 one or more operations on a specific qualified process tool 115, including transports and resources, as discussed further below. This scheduling includes, at times, the method 200 shown in FIG. 2. In the illustrated embodiment, for instance, the software agents schedule the lots 130 for processing on the process tools 115, as well as PMs and Quals for the process tools 115. This scheduling includes making optimizing decisions such as running an incomplete batch, as opposed to waiting for an approaching lot 130, and scheduling opportunistic preventive maintenance ("PM") procedures or qualification tests ("Quals") to meet specifications. The software agents 365 schedule activities such as lot transport and processing, perform MES transactions, monitor processing and transport, and react to deviations from scheduled activities or unscheduled activities.

The scheduling decisions in this particular embodiment are made by the software agents 365 based on a "contract net negotiation protocol." Note, however, that other scheduling approaches might be implemented in conjunction with the present invention. To further the implementation of the contract net negotiation protocol, an appointment commitment window concept is used to implement a floating appointment model approach. Each scheduling agent 365 maintains a "calendar" on which it books appointments for the respective manufacturing domain entity, e.g., process tool 115, lot 130, PM, Qual, or resource. The appointments scheduled through the scheduling decisions of the software agents 365 are "booked" on both the consumer and the provider's calendars. The appointment is booked for a duration in which it is expected the scheduled task will be accomplished.

Figure 4:
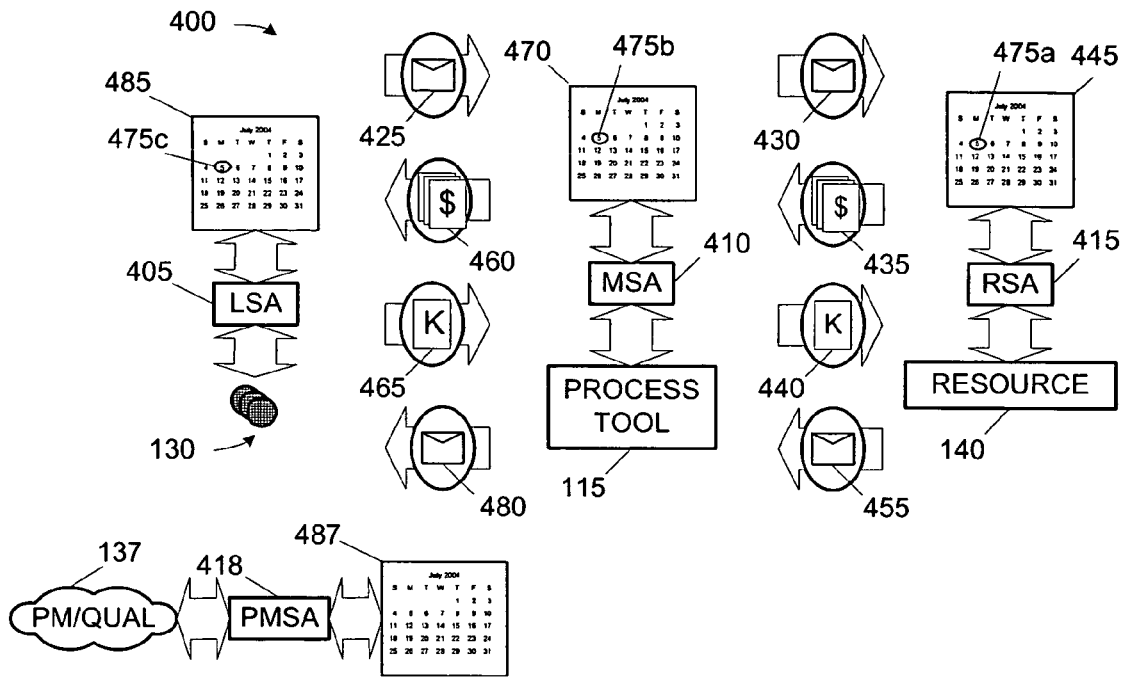
FIG. 4 conceptually depicts one particular implementation of the apparatus of FIG. 1, i.e., a portion of a process flow from a semiconductor fabrication facility, and the manner in which it schedules appointments for the consumption of resources.

FIG. 4 illustrates the negotiation for and scheduling of appointments using the contract net negotiation protocol in one particular implementation 400 of the process flow 100 first shown in FIG. 1. This contract net negotiation protocol is used, in the illustrated embodiment, to schedule the target process operation (209, in FIG. 2). In the illustrated embodiment, the software agents 365 are specialized along a number of lines, discussed more fully below, although this is not necessary to the practice of the invention. The particular embodiment illustrated in FIG. 4 specializes the software agents 365 by their functionality (e.g., scheduling, processing) and by the manufacturing domain entity they represent (e.g., lot, processing tool, resource).

Thus, in this particular embodiment, the process flow 400 includes, in addition to the lots 130, process tools 115, PM/Qual 137, and resource 140:

- a lot scheduling agent ("LSA") 405 representing the lot 130, which is a consumer of processing services;
- a machine scheduling agent ("MSA") 410 representing the process tool 115, which is both a consumer and a provider of processing services, depending on the context in which it is operating;
- a resource scheduling agent ("RSA") 415 representing the resource 140, which is a provider of processing services; and
- a PM scheduling agent ("PMSA") 418 which represents PMs and Quals 137, which are consumers of processing services.

In the illustrated embodiment, the lot 130, process tool 115, resource 140, and PMs and Quals 137 also have corresponding "processing" agents (not shown). The scheduling agents pass control to the processing agents when it is time to execute the scheduled activity.

Each of the scheduling agents 405, 410, 415, and 418, maintains and uses a respective calendar 485, 470, 445, and 487. The illustrated embodiment also specializes the calendars that are used for scheduling and managing appointments, as is discussed more fully below. Note, however, that this, too, is not required for the practice of the invention. Nevertheless:

the LSA 405 keeps a lot calendar 485;

the MSA 410 keeps a machine calendar 470;

the RSA 415 keeps a resource calendar 445; and the PMSA 418 keeps a PM calendar 487.

The types of appointments booked on the calendars will depend on the nature of the entity represented by the scheduling agent 365. In the illustrated embodiment, for instance, the scheduling agents 405, 410, 415, and 418 book the types of appointments set forth in Table 1 on the calendars 485, 470, 445, and 487, respectively.

TABLE 1

Appointments Booked by Scheduling Agents

| Agent Type | Calendar Type | Appt. Type | Appointment Description |
|---|---|---|---|
| LSA | Lot | Move | The lot is transported to the process tools. |
| | | Lot | The lot is processed on the process tools. |
| | | Carrier-in | The lot is loaded into the process tools. |
| | | Carrier-out | The lot is unloaded from the process tools. |
| | | Feeder | The lot accounts for the cycle time of upstream operations when scheduling several operations in advance, including configurable travel time to the process operation and wait time. |
| | | Maximum Move | The lot accounts for transport time from a feeder appointment until accurate moves can be scheduled from a specific process tool. |
| MSA | Machine | Lot Processing | A lot is processed on the process tools. |
| | | Setup | Process tool is prepared, or "setup," for a different type of processing than it is currently processing. |
| | | PM | PM is performed on the process tool. |
| | | Qual | Stand-alone Qual is performed on the respective process tool. |
| | | Machine Batch | Multiple lots are assembled into a batch and processed simultaneously. |
| | | Unscheduled Downtime | Period in which machine is unexpectedly down, and set for anticipated duration. |
| PMSA | PM | PM | PM and any follow-up Quals required by the PM are performed on a process tool. |
| | | Qual | Stand-alone Qual is performed on a process tool. |
| RSA | Resource | Lot Carrier-In | Resource loads a lot into a process tool. |
| | | Lot Carrier-In | Resource loads a lot into a process tool. |
| | | Lot Carrier-Out | Resource unloads lot from the process tool. |
| | | Charge Lot | Process tool and resource specific appointment in which, e.g., loaded lots are placed into a furnace tube by a furnace loader. |
| | | Discharge Lot | Process tool and resource specific appointment in which, e.g., loaded lots are removed from a furnace tube by a furnace loader. |
| | | Resource Carrier-In Batch | Resource loads a batch onto a process tool. |
| | | Resource Carrier-Out | Resource unloads a batch from a process tool. |

TABLE 1-continued

Appointments Booked by Scheduling Agents

| Agent Type | Calendar Type | Appt. Type | Appointment Description |
|---|---|---|---|
| | | Batch Resource Charge | Resource charges a batch into a portion of the respective process tool. |
| | | Batch Resource Discharge | An appointment for the associated resource to discharge a batch from a portion of the respective process tool. |
| | | Batch PM | PM is performed on the process tool. |
| | | Qual | Qual is performed on the process tool. |
| | | Downtime | Resource is expected to be down due to an unanticipated problem. |

Some PMs invoke the performance of follow-up Quals before the process tool 115 can be reintroduced to the process flow 100. These are called "follow-up Quals". Other Quals, however, are "stand-alone" Quals, i.e. they are not invoked by the occurrence of a PM. Follow-up Quals, as opposed to stand-alone Quals, should be performed after the PM that invokes them before any other kind of appointment. The illustrated embodiment therefore treats follow-up Quals as part of the PM that invoices them. Follow-up Quals are automatically scheduled to be performed upon completion of the PM that invoked them. The follow-up Quals are not represented by separate appointments on the machine and PM calendars 470, 487 and the duration of the scheduled PM appointments is sufficient not only for the PM, but also any follow-ups Qual it invokes. Thus, Qual appointments are scheduled on the machine and PM calendars only for stand-alone Quals.

The LSA 405 tries to keep the lot 130 it represents on schedule. The MSA 410 tries to maximize utilization of the process tool 115 it represents. Similarly, the RSA 415 tries to maximize utilization of the resource 140. The PMSA 418 opportunistically schedules PMs and Quals on, inter alia, the process tool 115. The various agents 405, 410, 415, and 418 do this concurrently in the context of negotiating appointments for the consumption of processing services by adjusting the prices they offer or budgets to pay for services in accordance with the schedules they need to meet or want to keep.

More particularly, a lot 130 typically negotiates with a number of process tools 115. The LSA 405 tries to find a time slot offered by a process tool 115 that will allow the lot 130 to meet its due date and feed the next bottleneck machine station at the appropriate time. At the same time, the MSA 410 tries to acquire lots 130 for processing in a way that optimizes the utilization of the process tool 115. The goals of the MSA 410 are to maximize the overall utilization of its respective process tool 115, respect the relative priority of the lots 130, reduce setup or recipe changes, and optimize its batch size. This collaboration of agent interaction results in the scheduling of a lot 130 on a particular process tool 115 within a specified time window.

In general terms, consumers of processing services initiate negotiations for those services. In accordance with the present invention, negotiations are initiated on the expiration of the timed offset following the detection of the triggering event. For instance, on expiration of the timed offset, the LSA 405 begins the negotiation by publishing a "request bid" message 425 to all of the MSAs 410 representing process tools 115 capable of performing a desired manufacturing operation. At this point, a MSA 410 is acting as a provider because the process tool 115 is providing services, i.e., processing time.

The MSA 410 for each capable process tool 115, upon receipt of the request bid message 425, identifies a potential bid, and recognizes whether it will need a qualified resource 140 to perform the job. If so, the MSA 410 publishes its own request bid message 430 to the RSAs 415 of all capable resources 140. The MSA 410 has now shifted from a provider at this point to a consumer since the process tool 115 is now consuming process services, i.e., time with the resource 140. Each RSA 415 representing a qualified resource 140 submits one or more bids 435, one of which the MSA 410 selects for inclusion in its bid 460. The MSA 410, having now identified the necessary resources, returns to its role as a provider of processing services. If another potential bid is identified by the MSA 410, it once again requests bids from the appropriate RSAs 415.

Each MSA 410 representing a capable process tool 115 submits one or more bids 460 to the LSA 405 that published the request bid message 425. The LSA 405 selects one bid 460 from among all the bids 460 of all the MSAs 410. The LSA 405 then awards the contract 465 to the MSA 410 submitting the selected bid 460. The MSA 410 checks its machine calendar 470, determines that the bid is still available and, if so, awards the contract 440 to the resource 140 that submitted the selected bid 435. The RSA 415 checks its resource calendar 445, sees that the bid is still available, and schedules the appointment 475a on its own resource calendar 445. The RSA 415 then confirms the contract with a "confirm bid" message 455, and the MSA 410 schedules an appointment 475b on its machine calendar 470, with a reference to the RSA 415 that provided the "resource" bid 435. The MSA 410 then sends a "confirmed bid" message 480 to the LSA 405. The LSA 405 then schedules the corresponding appointment 475c on its own lot calendar 485. When the time arrives for the appointments 475a, 475b, 475c to execute, the scheduling agents 405, 410, and 415 pass control to their respective processing agents (not shown).

Note that providing a particular process service may require no resources or more than one type of resource. An individual MSA 410 may therefore forego negotiations with the RSA 415 or may negotiate with several different types of RSAs 415. For example, lot processing may require not only a reticle resource 140, but also an empty carrier (not shown) and a WFT (also not shown). Thus, the MSA 410 may repeat the negotiation described relative to the RSA 415 and resource 140 several times.

Still referring to FIG. 4, selected portions of the "contract net negotiation protocol" approach with respect to the bids and calendars themselves shall now be discussed in greater detail. As mentioned, the bidding process begins when the LSA 405 requests the bids 460 from all capable process tools 115. As will be appreciated by those in the art having the benefit of this disclosure, capability will primarily be predicated on whether a process tool 115 can perform the process operation the lot 130 seeks to enter. When a LSA 405 requests a bid 460 from the capable process tools 115, it includes the following information in the bid request 425:

- the transport start time ("TST"), or earliest time to begin transport from the last (previous) process tool, or current location;
- the process-operation ("PO") and process-step ("PS") to be scheduled;
- the consumer's latest delivery time ("$LDT_C$"), or the latest completion time for the process operation that is acceptable to the lot 130;
- the identity of the last location, or "source" location, i.e., the location from which the consumer will be transported to the process tool 115; and
- the identity of the lot 130 requesting the bid.

In some embodiments, consumer agents provide a budget calculator to the provider agent. The budget calculator permits the provider agent to determine the consumer's priority relative to other appointments previously booked on the provider's calendar.

In one particular implementation, the LSA 405 calculates the initial value of $LDT_C$ as the time at which the lot will fall behind schedule. The corresponding $LDT_C$ is determined using the following equation:

$$LDT_C = DueDate - (CRA*DFLTLD + CRB) - TargetCR*(RPT*\beta)$$

where:
- DueDate=the time at which the lot 130 is due to complete the process flow 400;
- RPT=a sum of the cycle times of all the remaining process-operations;
- $\beta$=cycle time compression factor based on lot priority;
- CRA=configurable control A for critical ratio ("CR") adjustment proportional to expected cycle time;
- CRB=configurable control B for CR adjustment to accommodate disruption near the end of the process flow 400;
- DFLTLD=expected lead-time for the lot 130, i.e., expected total cycle time; and
- TargetCR=target Critical Ratio for $LDT_C$, a configurable variable whose initial value is set by lot priority and defaults to 1.0.

However, this initial value for the $LDT_C$ is not necessarily the value that is passed with the request for bids.

The MSA 410 for the capable process tools 115 formulate bids 460. As mentioned above, the MSA 410 maintains a machine calendar 470 to track its appointments. When the request bid message 425 is received, the MSA 410 searches the machine calendar 470 for an opening in which the lot 130 can be scheduled for an appointment. An "appointment" has a "processing window" ("PW"). A processing window is a time interval of an estimated duration for providing services defined by an Appointment Start Time ("TS") and an Appointment End Time ("TE"). In the floating appointment approach, most appointments have a "commitment window" ("CW") within which the process window PW may float. A "commitment window" is a time interval within which the service is to be provided. The start time of the commitment window CW is defined by the Earliest Start Time ("EST") when the consumer can be available for the service. The end time of the commitment window is defined by the provider's Latest Delivery Time ("$LDT_P$") for the service. Note that the $LDT_P$ may be different from the $LDT_C$ in the request bid message 425 from the LSA 405 for lot 130.

Besides the process window and the commitment window, an appointment may have other attributes depending on the nature of the appointment. For example, a move appointment will have attributes for the source location and the target location to represent the source and the destination of the move. A lot processing appointment will have attributes for the transport start time and the remaining transport time that will be used to calculate the dynamic earliest start time of the appointment. If a loading operation is involved in a process operation, the corresponding lot processing appointment will have two extra attributes for the load start time and the remaining load time. The dynamic EST of this lot processing appointment can therefore be derived from these four attributes together with the current time and static EST. Some appointments will share some same properties. For example, all the appointments have a processing window and an appointment ID, all the lot appointments will have a reference of a lot, and all the batch appointments will have a list of all the batch participants.

In the illustrated embodiment, the MSA 405 is permitted to search beyond the $LDT_c$ specified by the lot 130 if necessary in order to locate a valid bid 460. If this occurs, the MSA 410 sets the $LDT_p$ of the bid to the TE of the resulting appointment. Each appointment will store both the processing window PW [TS, TE] and the commitment window CW [EST, $LDT_p$] information. This information is then used, in the illustrated embodiment, in formulating the bids 460.

Figure 5:
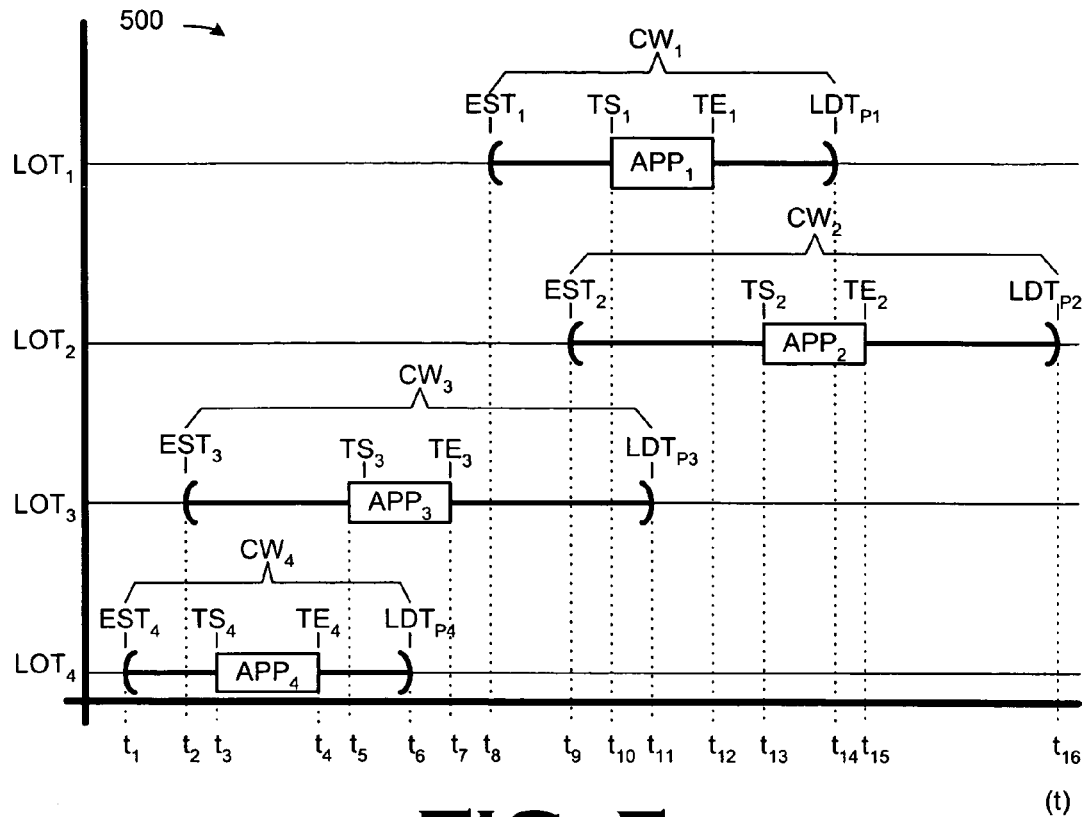
FIG. 5 conceptually depicts a calendar of booked appointments maintained and employed in accordance with the present invention.

More particularly, FIG. 5 conceptually illustrates a calendar 500 storing information concerning appointments for a process tool 115 for a number of consumers, which are lots 130 of wafers 135, in the illustrated embodiment. In FIG. 5, the MSA 410 for the process tool 115 has booked appointments $APP_1$-$APP_4$ for the lots $Lot_1$-$Lot_4$, respectively. Thus, the appointment information for $Lot_1$-$Lot_4$ is as follows:

$Lot_1$: $APP_1[t_{10}, t_{12}]$, $CW_1[t_8, t_{14}]$
$Lot_2$: $APP_2[t_{13}, t_{15}]$, $CW_2[t_9, t_{16}]$
$Lot_3$: $APP_3[t_5, t_7]$, $CW_3[t_2, t_{11}]$
$Lot_4$: $APP_4[t_3, t_4]$, $CW_4[t_1, t_6]$

The appointments $APP_1$-$APP_4$ represent processing windows within the commitment windows $CW_1$-$CW_4$. Note that, in the illustrated embodiment, several of the commitment windows overlap but none of the appointments do. However, in alternative implementations, this may not always be the case, as will be discussed further below.

Returning now to FIG. 4, the MSAs 410 for the capable process tools 115 next submit the bids 460 to the LSA 405. The bids 460 contain "bid information" that varies by implementation. The bid information might include, for instance, only the identification of the process tool 115 submitting the bid 460 and the processing time interval. In the illustrated embodiment, the bid information includes at least the:

TS≡Appointment Start Time, as defined above;
TE≡Appointment End Time, as defined above;
EST≡Earliest Start Time for processing, i.e., the earliest time at which the lot 130 can commit to be ready for processing at the process tool 115; and
$LDT_P$≡Latest Delivery Time, as defined above, which may be later or otherwise different than $LDT_C$ requested by lot.

However, additional information may also be included, such as the bid cost. In the illustrated embodiment, the process tool 115 may adjust the $LDT_P$ if it is not able to locate an appointment that finishes before the $LDT_C$ requested by the lot 130. This could be due to a late TS, the addition of a setup, or both.

The determination of the EST depends on the type of appointment. Most types of appointments have a static EST ("$EST_{static}$"). In this case, the static EST is a fixed time when the activity could start, such as the earliest time a time-based PM can start. However, some types of appointments calculate the EST dynamically. These types of appointments include lot appointments, lot processing appointments, carrier-in appointments, resource Lot Carrier-In appointments, and batch appointments. The basic calculation for dynamic EST is:

$$EST=\max(T+RTT, EST_{static})$$

where
T≡max($T_{now}$, TST);
$T_{now}$≡current time;
TST≡transport start time;
RTT≡remaining transport time (sum of all transport times between TST and lot appointment); and
$EST_{static}$≡static EST.

However, this basic calculation is, in the illustrated embodiment, varied in application in some contexts. In particular, loading constraints are applied to yield a more accurate determination when the lot 130 is to be loaded onto the process tool 115 before processing starts. Among these constraints are:

LST≡loading start time;
RLT≡remaining loading time; and
ELT≡earliest loading time, which is essentially the basic determination set forth above (i.e., the EST).

These loading constraints are attributes of lot appointments, lot processing appointments, and resource charge lot appointments. The following unloading constraints are attributes of PM, Qual, downtime, machine batch and resource charge batch appointments on the machine/resource calendars 470, 445:

UST≡unloading start time; and
RUT≡remaining unloading time.

If these unloading constraints are set, the respective appointment will be constrained so its shifting ability (discussed more fully below) requires that it maintain the required time interval between itself and the previous batch processing appointment so that lots 130 involved in a preceding appointment can be unloaded. This is not implemented via the dynamic EST because this is not a hard constraint. The UST and RUT are used by the machine calendar 470 to determine if a shift is valid.

An appointment with unloading constraints cannot start processing until the lots 130 in the previous appointment have completed unloading.

Returning to dynamic EST calculation, for a lot appointment:
if no loading is needed, then the EST=ELT;
if loading is needed, but has not yet started, then the EST=ELT+RLT; and
if loading has started but is not completed, then the EST=max (ELT, LST); and
once loading is complete, then the EST=$T_{now}$.

For a lot processing appointment or a resource charge appointment:
if no loading is needed, then the EST=ELT+$D_{setup}$;
if loading is needed, but has not yet started, then the EST=ELT+$D_{setup}$+RLT; and
if loading has started but is not completed, then the EST=max (ELT, LST); and
once loading is complete, then the EST=$T_{now}$.

In this determination, $D_{setup}$ is duration of the setup.

Note that the dynamic EST determination should consider whether the setup occurs before loading or whether setup and loading are performed in parallel. Note also that this implementation assumes the setup occurs before loading. And, for a batch appointment, the default determination is:

$$EST_{batch} = \max(EST \text{ of batch participants})$$

However, this formulation sometimes experiences problems where the batch participants require loading and the maximum load size is less than the maximum batch size.

The EST of each batch participant takes into account that the individual lot requires loading time but since the load size is less than the batch size, all of the lots 130 cannot be loaded in parallel. These difficulties can be resolved, however, by considering the order in which the participants will be loaded. To this end, each lot processing appointment and resource charge lot appointment includes an attribute "transferSequence" identifying where in the loading order the respective lot 130 falls, e.g., 1, 2, 4 indicating first, second, third. A value of "0" indicates that loading is not needed. However, other suitable algorithms may be employed in alternative embodiments.

Note that, because this determination is dynamic, some quantities used are updated when specific events occur. For instance, LSA 405 is responsible for updating the TST and the RTT of the lot 130. For instance, the values of RTT and TST are updated when:

- the appointment 475 is first booked, since the appointment will have new attributes RTT and TST whose initial values are set as follows:
  - TST≡TE of previous lot appointment (the current time $T_{now}$ is used if no previous appointment has been booked); and
  - RTT≡sum of the transport times of all transport appointments between TST and the processing appointment.
- a previous appointment completes, whereupon the value of TST is set to the actual end time TE of the previous appointment.
- a previous appointment's end time TE changes. This can occur due to previous appointment expanding (e.g., it runs late or the number of work pieces increase), shrinking (completes early or number of workpieces decrease), shifting left or shifting right, etc. In this case, the value of TST is set to the revised end time (the new TE) of the previous lot appointment.
- a transport appointment starts, whereupon the value of TST is set to the scheduled end time TE of the transport appointment that started and the value of RTT is decremented by the scheduled duration of the transport appointment that started.
- a transport appointment completes, whereupon the TST is updated with the actual end time (i.e., the actual TE) of the transport appointment;
- a transport appointment shifts left or right before transport starts. There is no change to TST or RTT of next lot appointment since they are based on an earlier lot appointment or transport appointment. Shifting of transport appointments is not permitted in the illustrated embodiment after they have started.
- a transport appointment expands/shrinks before transport starts. This could occur if a transport appointment is modified due to an unexpected change in the lot's location. The next lot's appointment is updated as follows:
  - RTT=(current RTT)−(old transport duration)+(new transport duration)
- a transport appointment expands/shrinks after transport starts, whereupon the next lot's appointment is updated as follows:
  - TST=revised end time(new TE)of transport appointment
- the lot location changes after the previous lot appointment is completed. The LSA is notified that a lot's location has unexpectedly changed and the existing transport appointments should be modified and/or cancelled. After modifying, canceling and/or re-booking the transport appointments that have not already started, the next lot appointment is updated as follows:
  - RTT=sum of the transport times of all transport appointments between TST and the next lot processing appointment
- the re-booking of a previous lot appointment, i.e., the previous lot appointment is cancelled and re-booked. TST and RTT should not change until a replacement lot appointment is re-booked. This may also require modifying, canceling and/or re-booking the subsequent transport appointments. The next lot appointment is updated as follows:
  - TST=new TE of previous lot appointment(the one re-booked); and
  - RTT=sum of the transport times of all transport appointments between TST and the next lot processing appointment Still other events might prompt an update in addition to, or in lieu of, those set forth above, depending on the implementation. The RSA 415 for the loading resource updates the LST and RLT in a similar fashion. For instance, the LST and RLT may be updated:

- when the appointment 475 is first booked, since the appointment will have new attributes LST and RLT, such that the initial values are:
  - LST=$EST_{static}$ of the lot appointment; and
  - RLT=the loading duration;
- if loading is needed. If loading is not needed, then the initial values are set to:
  - LST=null; and
  - RLT=0;
- when the loading appointment starts, whereupon:
  - LST=end time of the loading appointment; and
  - RLT=0;
- the loading appointment ends, whereupon LST=$T_{now}$;
- the loading appointment is shrunk or expanded before loading starts, whereupon RLT=the new loading duration; and
- the loading appointment is shrunk or expanded after loading starts, whereupon LST=the new end time of the loading appointment.

Still other events might prompt an update in addition to, or in lieu of, those set forth above, depending on the implementation.

Still referring to FIG. 4, and returning to the bidding process, each MSA 410 for each capable process tool 115 actually prepares multiple bids 460 predicated on different appointment start times. Each bid 460 includes a different "cost." In the illustrated embodiment, each of the scheduling agents 405 and 418, representing "end" consumers, has associated with it a budget calculator tool (not shown) to facilitate rapid budget determinations. Each provider scheduling agent 410, 415 calls the consumer's respective budget calculator tool to determine the relative priority of a consumer in formulating the multiple bids 460 being prepared.

More particularly, the scheduling agents 410 and 415, representing providers, each has an associated "cost calculators" (not shown) also employed in formulating bids to determine costs for available time slots. The cost determinations reflect the desire of the MSA 410 or RSA 415 to achieve its goals for its process tool 115 or resource 140. For instance, if the process tool 115 is relatively idle, the cost may be relatively low in an attempt to reduce machine idle time. Conversely, if the process tool 115 is relatively busy, the cost may be relatively high—thereby reflecting a lesser need to increase machine utilization. The MSA 410, representing an "intermediate" consumer, passes the budget calculator tool of the provider agent (e.g., the LSA 405, PMSA 418) with which it is negotiating to the provider agent with which it is also negotiating (e.g., the RSA 415). Thus, providers can readily determine the available budget for end consumers and costs for offering their processing services to the end consumers.

The MSA 410 packages the bid information and submits the bid(s) 460 to the LSA 405. In the illustrated embodiment, the MSA 410 actually returns several alternative bids 460, each with a different start time, in the form of a bid list. These bids 460 will be generated by using, in the illustrated embodiment, searches on the machine calendar 470 for open time slots using existing setups; open time slots requiring new setups; time slots where a lot 130 can join an existing batch; time slots where lots 130 can join an existing batch by bumping another lot 130; and time slots that require bumping ("canceling") appointments booked for other lots 130. Several of these searches may return the same time slot but a time slot should only appear once in the bid list returned to the lot 130. At least one bid 460 is always returned in this particular embodiment, and the minimum number of returned bids is determined by a configurable property value.

Note how maintenance of the calendars 485, 470, 445, and 487 facilitates the scheduling process. The calendars 485, 470, 445, and 487 impose a structure on booked appointments for the process flow 400 that permits the scheduling agents 405, 410, 415, and 418 to quickly and easily search through the booked appointments, find suitable time slots, and generate (or otherwise participate) in the bidding and bid conformation process. This structure also allows the application of appointment management routines, some of which are described below, that can similarly facilitate the scheduling process and help the process flow 400 to operate more efficiently.

After receiving all bids 460 from all MSAs 410 for the capable process tools 115, the LSA 405 evaluates the bids 460 and selects one bid 460 from among those submitted. The bids 460 are evaluated through an Objective Function F in light of the end time ("BidEndTime") of the bid 460 and some other information, including cost ("BidCost"). The LSA 405 for the lot 130 evaluates every bid 460 from every process tool 115 in this manner. An objective function F is employed:

$$F = COL(\text{BidEndTime}) * \text{Budget} * COLF + \text{BidCost}$$

where COL, the cost of lateness, is a function of the bid end time and COLF is a configurable weight. The bid 460 with the minimum objective function value is selected.

Still referring to FIG. 4, once the LSA 405 selects a bid 460, it awards the contract 465 to the MSA 410 that submitted the accepted bid 460. More technically, the LSA 405 sends a "confirm bid" message to the MSA 410. If the MSA 410 accepts the contract 465, and if the process operation does not involve any resources, it returns a "bid confirmed" message 480 to the LSA 405 to confirm the bid 460, and the appointment 475b is booked on the machine calendar 470 of the process tool 115 and appointment 475c is booked on the lot calendar 485. If the process operation requires resources, the MSA 410 will first send a "confirm bid" message 440, or contract, to the RSA 415 that submitted the bid. The RSA books the appointment 475a on its calendar 445 and sends a "bid confirmed" message 455 to the MSA 410. After receiving a bid confirmed message 455 from the RSA 415, the MSA 410 books the appointment 475b on its machine calendar 470 and sends the "bid confirmed" message 480 to the LSA 405, which books the appointment 475c on the lot calendar 485.

However, by the time the LSA 405 seeks confirmation of the bid 460, the machine calendar 470 of the process tool 115 may have changed and the time slot may not be available or the bid cost may have changed. The MSA 410 will confirm the bid 460 only if the time slot is available and the bid cost does not increase more than a configurable percentage of the original bid cost. Otherwise, the MSA 415 replies to the LSA 405 indicating the bid 460 is not confirmed.

If the process tool 115 does not confirm the selected bid 460, then the LSA 405 determines whether to start the bidding over or to select the next best bid. The LSA 405 compares the number of remaining bids 460 with a configurable "rebid threshold." If the number of remaining bids 460 is greater than the rebid threshold, the lot 130 returns to the bid selection process described above and selects the next best bid 460. After selecting the next best bid 460, the LSA 405 calculates the objective function F (discussed above) for the new bid 460. If the value of F has not increased by more than a configurable percentage of the objective function F for the best bid 460, the LSA 405 attempts to confirm the next bid 460. Otherwise, if the remaining bids are less than a rebid threshold or the objective function F for the next bid 460 has increased too much, the LSA 405 begins the entire process over again by requesting bids from all capable process tools 115.

As was mentioned above, the illustrated embodiment specializes the software agents 365 along several lines. This specialization particularly manifests itself in the MSAs 410. In one particular implementation, MSAs 410 differentiate as to whether they represent process tools 115 that are batch or are sequential ("cascading"). For example, there are many types of process tools 115, and each type of process tool 115 might possess different characteristics for which a respective software agent 365 might advantageously be specialized.

Exemplary characteristics that may lend themselves to specialization in machine agents (both scheduling and processing) in the illustrated embodiment include:

- whether the process tool 115 processes by wafer, by lot, or by batch;
- whether the process tool 115 processes wafers, lots or batches serially or sequentially;
- the number of ports for the process tool 115;
- whether the ports for the process tool 115 are input, output, or input/output;
- whether the chambers for the process tool 115 are used in series or in parallel;
- whether the process tool 115 can chain PMs;
- the number of chambers in the process tool 115;
- whether the process tool 115 includes internal storage;

whether the process tool 115 can start processing a lot or batch while completing processing of another lot or batch;

whether the process tool 115 requires loading and/or unloading;

whether the process tool 115 requires resources and, if so, whether those resources are dedicated resources or shared resources.

Note, however, that the factors along which a MSA 410, or any software agent 365, are specialized will be implementation specific.

Consider, for instance, an implementation wherein machine agents are specialized by whether they process by wafer, by lot, by batch, etc. In one particular embodiment, the machine agents set forth in Table 2 are employed. This particular embodiment implements the agents using object oriented programming techniques and the baseline agents provide the class definition and the others are subclasses of that class.

TABLE 2

Machine Agents

| | | |
|---|---|---|
| baseline processing agent | wafer-based processing agent | wafer-based, sequential processing agent |
| wafer-based batch sequential processing agent | wafer-based, batch processing agent | lot based processing agent |
| lot-based, sequential processing agent | lot-based, batch processing agent | lot-based batch sequential processing agent |
| baseline scheduling agent | wafer-based scheduling agent | wafer-based, sequential scheduling agent |
| wafer-based, batch sequential scheduling agent | wafer-based, batch scheduling agent | lot-based scheduling agent |
| lot-based, sequential scheduling agent | lot-based, batch scheduling agent | lot-based batch sequential scheduling agent. |

Other agent specializations might also be employed. PM agents may be specialized by whether the maintenance procedures they perform are based on time, wafers processed, lots processed, batches processed, processing time, an occurrence of an event, etc. In one particular embodiment, the following PM agents are employed:

a wafer-based PMSA;

a time-based PMSA;

a processing unit-based (e.g., number of lots processed, number of batches processed) PMSA;

an event-based PMSA; and a processing time-based (e.g., cumulative processing time) PMSA. Resource agents may likewise be specialized by whether they represent dedicated resources (e.g., a loading resource used by only one machine) or a shared resource (e.g., a wafer fab tech, reticle, or empty carrier) that may be shared among multiple process tools 115. Lot agents may also be specialized according to their priority, product, product family, or other attributes that mitigate for differentiation of behavior. Still other specializations may be employed in alternative embodiments.

Also as alluded to above, the illustrated embodiment specializes the calendars employed by the manufacturing domain entities. Calendars, e.g., the calendar 427 in FIG. 4, may also be specialized as are the machines, lots, resources, or PMs with which they are associated. Note, however, that this is not necessary to the practice of the invention. The OOP implementation of the illustrated embodiment facilitates this specialization through inherited properties. Table 3 lists the class and subclasses of scheduling calendars used in the illustrated embodiment. Note that not every calendar class has subclasses.

TABLE 3

Calendar Specialization Hierarchy

| Calendar Class | Calendar Subclass (1) | Calendar Subclass (2) |
|---|---|---|
| Machine Calendar | Batch Machine Calendar | Lot Batch Machine Calendar Wafer Batch Machine Calendar |
| | Lot Machine Calendar | N/A |
| | Wafer Machine Calendar | N/A Wafer Sequential Machine Calendar |
| | Sequential Machine Calendar | Wafer Batch Sequential Machine Calendar Lot Batch Sequential Machine Calendar Lot Sequential Machine Calendar |
| PM Calendar | N/A | N/A |
| Lot Calendar | N/A | N/A |
| Resource Calendar | Shared Resource Calendar | WFT Calendar Empty Carrier Calendar MT Calendar Reticle Calendar |
| | Dedicated Resource Calendar | Loading Resource Calendar |

Thus, where these types of agent specialization are employed, the calendars 470, 485, 445, and 487 may also be specialized. On some specialized calendars-sequential machine calendars, for example—a portion of the appointment is allowed to overlap with other appointments. The term "sequential" refers to a capability for processing more than one material (e.g., wafer 135, lot 130, or batch) at a time. That is, the process tool 115 can begin processing a second material before it is finished processing a first material. Consider, for example, an implementation of a process tool 115 called a "sink" (not shown). A sink has several tubs in which lots 130 of wafers 135 can be exposed to various chemical baths in sequence. While one lot 130 is being exposed in one bath, a second lot 130 can be exposed in a second bath, and both are being processed by the same process tool 115 in sequence.

Figure 6:
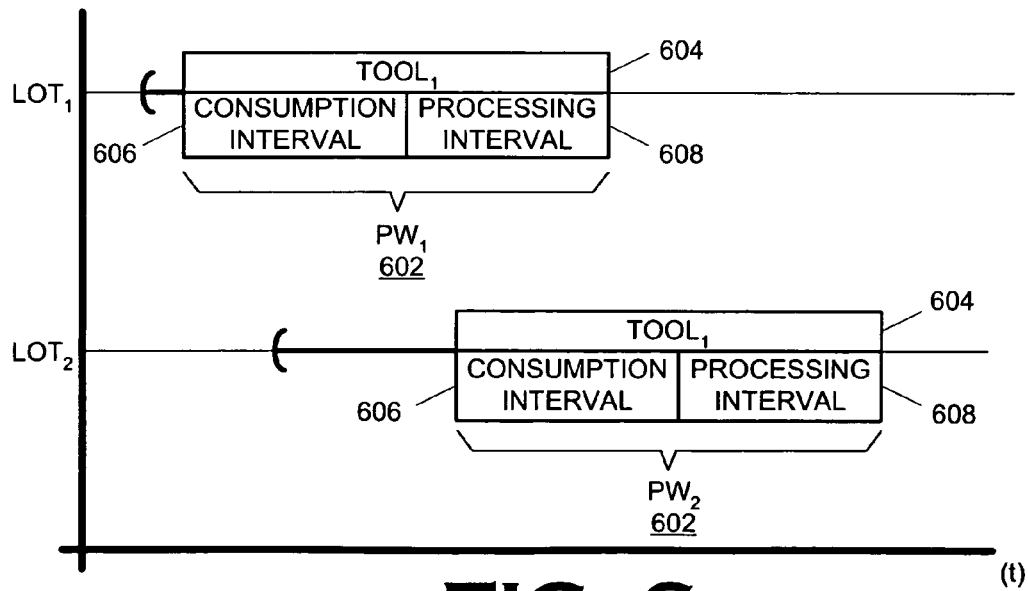
FIG. 6 conceptually illustrates one particular implementation in which some portions of some appointments are permitted to overlap.

In cases where the process tool 115 is a sequential machine, and the MSA 410 and the machine calendar 470 are specialized, some portions of some appointments may overlap. As is shown in FIG. 6, the processing window PW 602 of an appointment 604 in these calendars will is have two intervals: a consumption interval 606 and a processing interval 608. (Note that the concomitant commitment windows are omitted in FIG. 6 for the sake of clarity.) In the consumption interval 606, the lots 130 are entering the process tool 115 (i.e., being "consumed") for processing. The processing interval 608 is then defined to be everything else in the PW 602 after the consumption interval 606. The processing interval of one appointment may overlap with the consumption interval of another appointment with the same setup requirements, but none of the consumption intervals can overlap. In FIG. 6, the lots $LOT_1$, $LOT_2$ have scheduled appointments 604 on the process tool $TOOL_1$ wherein the consumption interval 606 for the appointment 604 of the lot $LOT_2$ overlaps the processing interval 608 of the appointment 604 for the lot $LOT_1$. Note, however, that lot processing appointments requiring different setups cannot be overlapped even on this type of specialized machine calendar 470.

Thus, as was mentioned above, the type of appointments scheduled on any given calendar will depend largely on the nature of the entity that the software agent 365 that is keeping the calendar represents and the degree of agent and calendar specialization. In the illustrated embodiment, there are four types of scheduling agents as is set forth in Table 1: MSA, LSA, RSA and PMSA. Each scheduling agent will have its own scheduling calendar to store its booked appointments: machine calendar, lot calendar, resource calendar, and PM calendar.

Figure 7:
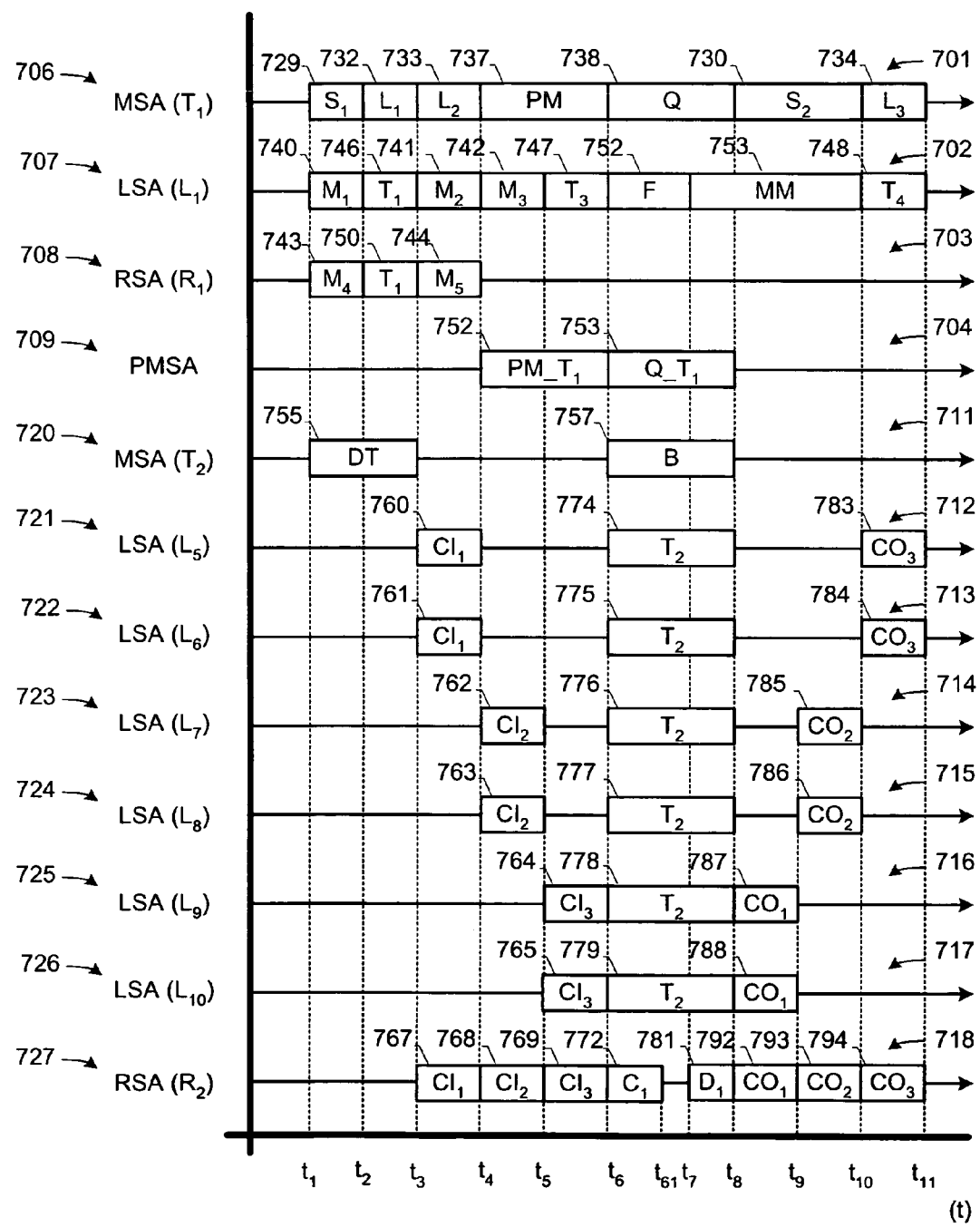
FIG. 7 conceptually depicts a number of calendars of booked appointments illustrating selected aspects of the interaction and characteristics of the calendars and scheduling agents.

To present an overview and to help illustrate how agent, calendar, and appointment specializations interact in the illustrated embodiment, FIG. 7 conceptually illustrates a variety of calendars to help illustrate the various types of appointments kept by various types of calendars in the illustrated embodiment. FIG. 7 also helps illustrate how some of appointment types on some calendars are booked with "corresponding" appointments on other types of calendars. More particularly, FIG. 7 depicts:
- a machine calendar 701 for a process tool $T_1$ maintained by a MSA 706;
- a lot calendar 702 for a lot $L_1$ maintained by a LSA 707;
- a resource calendar 703 for a machine resource $R_1$ maintained by a RSA 708; and
- a PM calendar 704 for preventive maintenance maintained by a PMSA 709.

FIG. 7 also illustrates:
- a machine calendar 711 for a process tool $T_2$ kept by a MSA 720;
- a plurality of lot calendars 712-717, each for a respective lot $L_5$-$L_{10}$ kept by a respective LSA 721-726; and
- a resource calendar 718 for a machine loading resource $R_2$ kept by a RSA 727.

In the illustration of FIG. 7, as opposed to the illustration of FIG. 5, all appointments for a given calendar are collapsed onto a single timeline. The commitment windows for each appointment are omitted to facilitate this collapse and to keep from unduly cluttering the illustration. A brief discussion of the various kinds of appointments summarized in Table 1 and illustrated in FIG. 7 for this particular embodiment follows immediately below.

MSAs (e.g., MSAs 706, 720) schedule and book a number of types of appointments summarized in Table 1. In FIG. 7, a MSA 706 for the tool $T_1$ books several kinds of appointments on the machine calendar 710. These include: the setup appointments 729-730; the lot processing appointments 732-734; a PM 737; and a stand-alone Qual 738. As is shown on the machine calendar 715 for the tool $T_2$, the MSA 720 booked a machine batch appointment 757 and a downtime appointment 755. Note that, in the illustrated embodiment, some appointments may be scheduled for any process tool 115, e.g., the setup appointments 729-730, lot processing appointments 732-734, the PM appointment 737, and the Qual appointment 738. However, some may not. For instance, the batch appointment 757 cannot be scheduled on process tools 115 that do not perform batch operations. (Note that, for batches, lot processing appointments are not scheduled directly on the machine calendar 470. Rather, they are booked as participants of the batch appointment.) Some embodiments may also employ alternative kinds of appointments.

The lot processing appointments 732-734 are the appointments in which the tool $T_1$ is scheduled to actually perform the processing on the lots $L_1$, $L_2$, $L_3$. As will be appreciated by those skilled in the art having the benefit of this disclosure, the tools $T_1$, $T_2$ will occasionally have to undergo a "setup" in preparation for processing a given lot. All else being equal, it is generally preferable to reduce the number of setups by scheduling lots requiring the same setup successively. Such is the case for the lots $L_1$, $L_2$ on the tool $T_1$, whose lot processing appointments 732-733 are scheduled together after the setup appointment 729 since they require the common setup $S_1$. These types of preferences are realized in the scheduling process in the formulation of bids discussed above. More particularly, cost factors are apportioned in the bidding process to encourage lot processing appointments having common setups to be scheduled together. However, in FIG. 7, the lot $L_3$ requires a new setup $S_2$, and the MSA 706 has scheduled a separate setup appointment 730 prior to the lot processing appointment 734. Note that, although not shown, setup appointments are scheduled in a similar fashion for tools (e.g., the tool $T_2$) on which batch operations are performed.

As the name implies, the batch appointment 757 is an appointment on a process tool 115 (e.g., $T_2$) to process a batch of lots 130. Each lot 130 (e.g., $L_5$-$L_{10}$) is considered a "participant" in the batch, and the batch appointment actually comprises a plurality of "participant" appointments (not shown). Participant appointments are, in actuality, lot processing appointments that describe the makeup of the batch. In the illustrated embodiment, the lot appointments 774-779 are counterpart "participant appointments" for the batch appointment 774. Lots 130 may be added to or removed from a batch by joining, removing, canceling, and/or bumping individual participant appointments. If the batch needs loading onto the process tool 115, the RSA 727 will schedule carrier-in ("CI") and carrier-out ("CO") appointments 767-769, 793-794 in a manner discussed more fully below.

As summarized in Table 1, the LSAs 707, 721-726 for the lots $L_1$, $L_5$-$L_{10}$ usually book six kinds of appointments on the lot calendars 702, 712-717: the move appointments 740-742; the lot appointments 746-748, 774-779; a maximum move appointment 753; a feeder appointment 752; carrier-in 760-765 (e.g., $CI_1$, $CI_2$, $CI_3$); and carrier-out 783-788 (e.g., $CO_1$, $CO_2$, $CO_3$). The move appointments 740-742 and lot appointments 746-748, 774-779 are scheduled where all the parameters used to schedule with certainty are known.

More particularly, the lot appointments 746-748, 774-779 are appointments for processing the respective lots $L_1$, $L_5$-$L_{10}$ on the particular process tools $T_1$-$T_5$. As will be appreciated by those skilled in the art having the benefit of this disclosure, the lots 130 typically are moved from process tool 115 to process tool 115 in order to be processed on successive operations defined in the lots' processes. For example, FIG. 1 illustrates a lot 130 being moved from a first process tool 115, or source location, on the left to a second process tool, or destination location, on the right. These moves are generally scheduled as the lot appointment is scheduled.

There are typically two types of moves-interbay and intrabay moves. Interbay moves transport lots 130 between bays (not shown) of the manufacturing facility. Intrabay moves transport lots 130 to different locations within the same bay. So, a typical move of a lot 130 from one process tool 115 to another process tool 115 in a different bay involves at least three moves: an intrabay move from the port of a first process tool 115 to a stocker (not shown) in that tool's bay; an interbay move from that stocker to another stocker (also not shown) which is in the same bay as the second process tool 115; and the final intrabay move from that stocker to the port of the second process tool 115. Note that, in these embodiments, each move actually constitutes at least two constituent moves, a move from a process tool 115 to, e.g., a stocker or some other WIP resource, and a move from the WIP resource to the next process tool 115. Each of these constituent moves is separately scheduled, as in the case of the move appointments 741, 742.

However, that some embodiments may employ what is known as a "unified AMHS." A unified AMHS permits moves directly between process tools 115 without stopping at some intermediate WIP resource. Thus, in some embodiments, only one move may be scheduled between process operations on different process tools 115.

The maximum move appointments 753 and feeder appointments 752 are scheduled as "placeholders" on the calendars until sufficient certainty is achieved in scheduling that they can be replaced. As was noted above relative to FIG. 1, the method 200, shown in FIG. 2, may be used to schedule appointments for process operations that are further downstream than the immediately successive process operation. In this circumstance, the intervening process operations may be scheduled. Furthermore, typically, several different process tools 115 may be qualified to perform any of the intervening process operations. Thus, where the intervening process operations are not scheduled, the source of the move to the target process operation is not known.

Consequently, for purposes of scheduling the target process operation, the consumer's scheduling agent books one or more maximum move appointments 753 and/or feeder appointments 752. The maximum move appointments 753 and/or feeder appointments 752 are explicit scheduling constraints, or "placeholders", representing best estimates for the unscheduled intervening process operations. Once the source and destinations are known, the maximum move appointment 753 and the feeder appointment 252 can be replaced by move and lot appointments such as the move appointments 740-742 and lot appointments 746-748, 774-779. More precisely, a maximum move appointment 753 is replaced on the calendar when the source and destination process tools 115 are known and move durations can be determined. A feeder appointment 752 is replaced when the process operation it represents is scheduled, i.e., when the associated triggering event for the process operation is detected and the process operation is scheduled. Thus, the feeder appointment 752 and maximum move appointment 753 are useful in the context of scheduling several operations in advance before scheduling some of the earlier intervening operations for a particular process tool 115.

Note that feeder appointments 752 are used in conjunction with maximum move appointments 753 to account for the cycle time of upstream operations when scheduling several operations in advance. More particularly, feeder appointments 752, account for travel time to the otherwise unscheduled process operation and wait time. Move time away from the otherwise unscheduled process operation is rolled into the maximum move appointment 753. If two feeder appointments 752 are scheduled back-to-back, travel time away from the previous feeder appointment 752 will be accounted for as the time needed to move to the second feeder appointment 752 and the wait time. Thus, where two feeder appointments 752 are scheduled back-to-back, intervening maximum move appointments 753 can be omitted.

The feeder and maximum move appointments represent explicit, as opposed to implicit, constraints on the scheduling process. Explicit constraints are represented as appointments on the calendars that directly affect the scheduling and booking of other appointments. Examples of explicit constraints include, but are not limited to, move, load, unload, maxmove, and feeder appointments. These appointments explicitly constrain the scheduling of the lot appointments on the lot calendar. Implicit constraints are not represented as appointments on the calendar, but rather as attributes of the appointments they affect. For example, the lot processing appointment on the machine calendar has attributes that represent the constraints of loading, transport, and unloading because these constraints are not represented by appointments on the machine calendar. Similarly, discharge duration, like the UST and RUT, discussed above, also is an implicit constraint. Like the UST and the RUT, the discharge duration is not a hard constraint—so, it does not affect the dynamic EST, but it does constrain shifting because loading or unloading related to the next batch appointment cannot overlap with the discharge.

In a partially automated fab, only a portion of the process operations may be scheduled and controlled by the software agents 365. Thus, only a subset of the process tools 115 in the fab are under the control of the software agents 365 and the fab is not fully under the control of this system. Those process operations controlled by the software agents 365 are called "control process operations." The illustrated embodiment nevertheless represents uncontrolled process operations with appointments in the scheduling process to explicitly constrain the scheduling of control process operations.

For some process operations, the process tool 115 (e.g., the tool $T_2$) may require loading and unloading the lot 130. For those operations, the LSA (e.g., the LSAs 721-726) will book carrier-in and carrier-out appointments (e.g., the carrier-in and carrier-out appointments 760-765, 783-788) on its own calendar (e.g., the lot calendars 712-717). These carrier-in and carrier-out appointments match the carrier-in and carrier-out appointments (e.g., the carrier-in and carrier-out appointments 767-769, 792-794) scheduled by the RSA (e.g., the RSA 727) on its calendar (e.g., the resource calendar 718).

In FIG. 7, the tool $T_2$ requires loading, and the resource $R_2$ loads the lots $L_5$-$L_{10}$ on the tool $T_2$ in a manner more fully described below. Consequently, the RSA 727 for the resource calendar 718 for the resource $R_2$ includes carrier-in appointments 767-769 and carrier-out appointments 792-794 in which the resource $R_2$ is scheduled to load the lots $L_5$-$L_{10}$ on the tool $T_2$. Note that each of the lot calendars 712-717 includes carrier-in and carrier-out appointments 760-765 and 783-788 that are counterparts to the carrier-in appointments 767-769 and carrier-out appointments 792-794 on the resource calendar 718. Note further that the machine calendar 711 for the tool $T_2$ does not contain any carrier-in or carrier-out appointments, but the lot processing appointment has attributes representing these implicit constraints.

The PMSA 709, as summarized in Table 1, books two kinds of appointments on the calendar 730: PM appointments such as the PM appointment 752, and stand-alone Quals such as the Qual appointment 753. The PMSA 709 schedules PMs and Quals opportunistically, but in accordance with known constraints on when they should be scheduled. The calendar 730 shows only the one PM appointment 752 and the one Qual appointment 753 scheduled for the tool $T_1$. Note that the machine calendar includes counterpart PM and Qual appointments 737-738 booked thereon. Multiple PMs and Quals may be performed on a tool, and so the machine and PM calendars 701, 793 in an actual embodiment may include multiple PM and Qual appointments for one tool. Some PMs are required to be followed by one or more follow-up Quals before the process tool 115 can be reintroduced to the process flow 400. In these circumstances, the follow-up Quals are automatically scheduled within the PM appointment.

RSAs (e.g., the RSAs 708, 727), in the illustrated embodiment, are specialized by the kind of resource they represent. There generally are two kinds of resources: shared resources and dedicated resources. Shared resources are resources that may be shared by multiple process tools 115, such as the resource 140 shown in FIG. 4. Dedicated resources, such as machine loaders (not shown) operate in conjunction with a single process tool 115. This type of specialization of resource calendars is but one salutary variation permitted by the use of specialized agents discussed above.

The types of appointments booked by a RSA depends on the type of resource it represents. The shared RSA 708 for the resource $R_1$, shown in FIG. 7, books at least two kinds of appointments on its own resource calendar 703: resource consumption appointments such as the resource consumption appointment 750 and move appointments such as the move appointments 743, 744. Since the resource $R_1$ is shared by several process tools 115 (e.g., $T_1$), it may need to be moved among the process tools 115—hence, the move appointments 743, 744. Note that the moves themselves may be performed by still other resources (not shown) and a shared resource such as a reticle may be moved to a storage location such as a reticle stocker when it is not being used at a process tool.

The dedicated RSA 727 schedules appointments related to its dedicated process tool 115 (e.g., $T_2$) only. In the illustrated embodiment, the dedicated RSA 727 represents a machine loading resource (not shown) for a furnace (also not shown). The dedicated RSA 727 books four kinds of appointments on the calendar 740: the carrier-in appointments 767-772; the charge appointment 772; the discharge appointment 781; and the carrier-out appointments 792-794. The carrier-in appointments 767-772, charge appointment 772, discharge appointment 781, and carrier-out appointments 792-794 are implementation specific and are discussed in more detail immediately below.

Some process tools 115 (e.g., $T_2$) perform lot batch process operations in which multiple lots 130 are simultaneously processed in a batch. Some of these process tools 115 use load, charge, discharge and unload steps. In the embodiment of FIG. 7, the tool $T_2$ first loads all the batch participants, i.e., lots 130, from the tool I/O ports (not shown) to the tool internal stocker (also not shown). Usually this type of process tools 115 has multiple I/O ports, and the load/unload operations are also performed in batches.

For example, if the tool $T_2$ has two I/O ports, and the batch process operation allows a maximum of six participants in a batch, three batch load operations are required to load six lots 130 into the internal stocker of the tool $T_2$. After all the batch participants are loaded, the tool $T_2$ performs a batch charge operation to move the batch participants from the internal stocker into a furnace tube (not shown) before the processing can actually begin. After the tool $T_2$ completes the batch process operation, it discharges the batch participants from the tube back into the internal stocker. Finally when the lots 130 are ready to be moved to the tool I/O ports, a sequence of batch unload operations is performed.

Due to the constraints of the tool internal transport mechanism, appointments are not permitted to overlap on this kind of resource scheduling calendar. These load, charge, discharge, and unload activities are performed in a mutually exclusive fashion, i.e., they cannot occur at the same time because they use the same resource. Thus, loading moves the lot 130 from a machine port to an internal stocker of the machine. Charging moves the wafers 135 from the internal stocker to the furnace tube for heating (processing). Discharging removes the wafers 135 from the furnace tube (after cooling) and moves them back to the internal stocker. Unloading moves the lot 130 from the internal stocker to a machine port.

Note that the RSA 727 is not concerned with the actual processing—that is represented on the machine calendar 711 by the batch appointment 757. However, there is a relationship between the charging and discharging appointments 772, 781 on the resource calendar 718 and the batch appointment 757 on the machine calendar 711. More particularly, charging starts when processing starts and discharging ends when processing ends. Charging or discharging typically takes about 15 minutes while processing typically takes four or more hours. On the machine calendar 711, the batch is considered "processing" from the time the start command is issued (before charging starts) until the furnace has completed discharging. Note that the MSA 720 is not concerned with loading, charging, discharging or unloading because these are all tracked by the RSA 727 on its resource calendar 718. The machine calendar 711 contains the batch appointment 757 that represent "processing," which is time when no other batch can be "processing" on the tool $T_2$.

As previously mentioned, on the machine calendar 711, the batch appointment actually contains participants that are each lot processing appointments, one for each lot 130 in the batch. Meanwhile, loading and unloading activities can occur in parallel with "processing," so long as they do not conflict with one another or with charging or discharging. Loading or unloading lots while another batch is "processing" is a technique for increasing the throughput of the furnace.

For this particular type of furnace, the lots $L_5$-$L_{10}$ are loaded two at a time because that is the number of machine I/O ports where lots 130 can be loaded or unloaded. But, the furnace can run up to six lots 130, so if the number of lots 130 in the batch is more than two, then the lots 130 are loaded in sub-batches of two lots 130. Thus, the lots $L_5$, $L_6$ are loaded during the carrier-in appointment 767 on the resource calendar 718, the lots $L_7$, $L_8$ during the carrier-in appointment 768, and the lots $L_9$, $L_{10}$ during the carrier-in appointment 769. Note that the carrier-in appointments 767-769 on the resource calendar 718 have counterpart appointments on the lot calendars 712-717.

More particularly, since each carrier-in appointment 767-769 includes two lots, each of the carrier-in appointments has two counterparts. Thus, the carrier-in appointment 767 has counterparts 760, 761 on the lot calendars 712, 713; the carrier-in appointment 768 has counterparts 762, 763 on the lot calendars 714, 715; and the carrier-in appointment 769 has counterparts 764, 765 on the lot calendars 716, 717. So, a batch with six lots 130 (e.g., lots $L_5$-$L_{10}$) might have three sub-batch carrier-in appointments (e.g., carrier-in appointments 767-769) on the resource calendar (e.g., resource calendar 718). Note also that, in the illustrated embodiment, each carrier-in appointment 767-769 is actually a batch loading appointment containing a resource carrier-in appointment for each participant lot that is being loaded.

Charging is performed for all lots 130 (with a maximum of six) at the same time on this particular furnace. The charge appointment 772 represents the charging batch, which actually comprises a participant charge appointment (not shown) for each participant (e.g., lots $L_5$-$L_{10}$) in the batch. Thus, for each furnace run, there will be one charge appointment 772 with up to six participants. Discharging is also performed for all lots 130 at the same time. The discharge appointment 781 represents the discharging batch and actually comprises a participant discharge appointment (not shown) for each participant (e.g., lots $L_5$-$L_{10}$) in the batch. For each furnace run, there will be one discharge appointment 781 with up to six participants. As was mentioned earlier, however, the individual lots 130 (e.g., lots $L_5$-$L_{10}$) are not concerned with charging and discharging, as these steps are internal to the process tool (e.g., the tool $T_2$). Thus, the charge and discharge appointments 772, 781 have no counterparts on the lot calendars 712-717. The lots $L_5$-$L_{10}$, instead subsume the time for charging and discharging into the lot appointments 774-779.

Unloading, or carrier-out, is the reverse of loading. Like loading, unloading is performed in sub-batches of at most two lots 130 at a time. So, a batch with six lots 130 (e.g., lots $L_5$-$L_{10}$) might have three sub-batch carrier-out appointments (e.g., carrier-out appointments 792-794) on the resource calendar (e.g., the resource calendar 718). The carrier-out appointments 792-794 also each have two counterparts appointments on the lot scheduling calendars 712-717, one for each participant in that particular sub-batch carrier-out. The carrier-out appointment 792 has counterpart carrier-out appointments 788, 787 on the lot calendars 716, 717; the carrier-out appointment 793 has counterpart carrier-out appointments 785, 786 on the lot calendars 714, 715; and the carrier-out appointment 794 has counterpart carrier-out appointments 783, 784 on the lot calendars 712, 713.

Note that the sequence for unloading is independent of the sequence for loading. Loading sequence is primarily dependent on arrival time (EST) of the lots 130, while unloading sequence may depend on the priority of the lot 130 or the time of its next appointment. Thus, although unloading is performed in the reverse order of loading in the illustrated invention, this is not necessary. Note also that, in the illustrated embodiment, each carrier-out appointment 792-794 is actually a batch carrier-out appointment containing a resource lot carrier-out appointment for each participant lot that is being unloaded.

In FIG. 7, the results of the interaction of the MSAs 706, 720; LSAs 707, 721-726; RSAs 708, 727, and the PMSA 709 can be seen by comparing the various calendars. The lot processing appointment $L_1$ is scheduled on the machine calendar 701 for [$t_1$, $t_2$], on the reticle calendar 740 and on the lot calendar 720 as $T_1$ for the same period. However, note that the MSA 706 considers the setup $S_1$ and the LSA 707 considers the move $M_1$ in scheduling this appointment.

Similarly, the PM is scheduled on the machine calendar 701 for the tool $T_1$ and on the preventive maintenance calendar 704 for the period [$t_4$, $t_6$] and the Qual is scheduled on the machine and PM calendars 701, 704 for the period [$t_6$, $t_8$]. For the batch process operations require loading, charging, discharging and unloading steps, a lot load appointment and a lot unload appointment are scheduled on the lot calendars 712-517 and a batch carrier-out appointment and a batch carrier-out appointment with the same time interval as those on the lot calendar are scheduled on the loading resource calendar 718. A batch lot processing appointment is scheduled on the machine calendar 711 for [$t_6$, $t_8$], a batch charge appointment for the period [$t_6$, $t_{61}$] and a batch discharge appointment for the period [$t_7$, $t_8$] are scheduled on the loading resource calendar 718.

Figure 8:
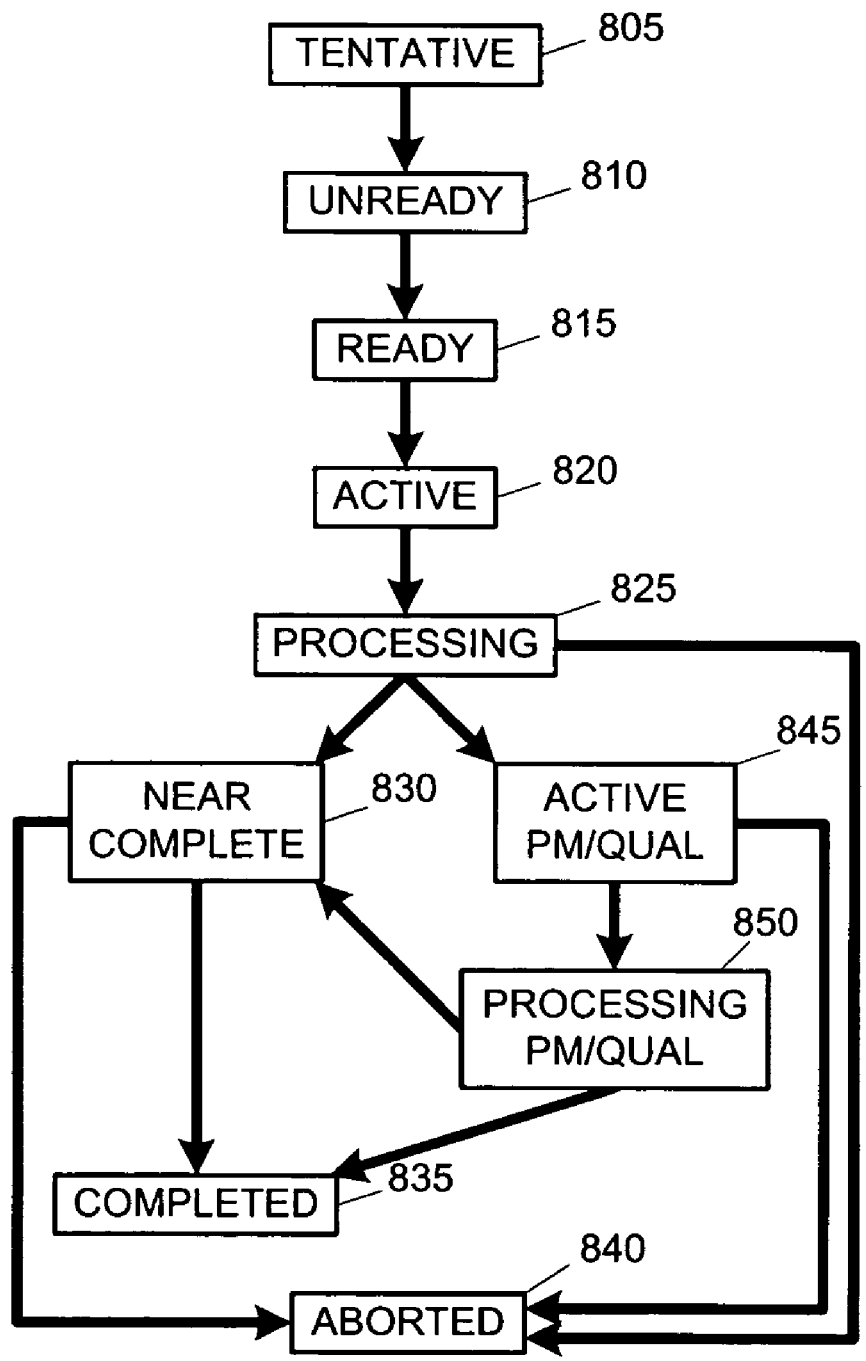
FIG. 8 diagrams the changes in status of appointments in one particular implementation.

The scheduling disclosed relative to FIG. 3-FIG. 7 is performed in accordance with the present invention upon detection (at 206, FIG. 2) of a previously defined (at 203, FIG. 2) triggering event and on expiration (at 209, FIG. 2) of a previously defined time offset (at 203, FIG. 2). The illustrated embodiment defines "triggering events" as changes in the "status" or "state" of appointments. FIG. 8 is a diagram 800 for state in which appointments may exist in the illustrated embodiment. At any given time, each appointment will have a tentative (at 805), unready (at 810), ready (at 815), active (at 820), processing (at 825), near complete (at 830), completed (at 835), or aborted (at 840) status. Note that, in the illustrated embodiment, PMs and Quals may also be in an active PM/Qual (at 845) or processing PM/Qual (at 850) status. The scheduling agents maintaining calendars are responsible for changing the appointment status when specific events occur.

Referring now to both FIG. 4 and FIG. 8, for example, when a lot processing appointment is initially created, for example, it will be assigned the "tentative" status (at 805). When the appointment was booked onto the process tool calendar 470, the MSA 410 will change the appointment status from "tentative" (at 805) to "unready" (at 810). When the lot 130 arrives at the I/O port (not shown) of the process tool 115, the MSA 410 will change the appointment status to "ready" (at 815). When the start time of the appointment arrives, the MSA 410 will change the appointment status to "active" (at 820).

After receiving a message from the equipment interface (not shown) of the process tool 115 indicating that the lot 130 is actually started processing on the process tool 115, the MSA 410 changes the appointment status to "processing" (at 825). Depending on the type of the process tool 115, the MSA 410 may change the appointment status from "processing" (at 825) to "near complete" (at 830). Typically, this change is made if the MSA 410 receives another message from the equipment interface indicating that the process tool 115 has reached a specified processing stage. For example, the passage of 80% of the processing time might indicate that an appointment is "near complete." When the lot 130 completes or aborts its processing on the process tool 115, the MSA 410 changes the appointment status to "completed" (at 835) or "aborted" (at 840), respectively.

Note that illustrated embodiment does not employ all appointment state changes as "triggering events." The illustrated embodiment only employs active (at 820), active PM/Qual (at 845), processing (at 825), processing PM/Qual (at 850), near complete (at 830), and completed (835) appointment states as triggering events. In general, the tentative (at 805), unready (at 810), and ready (at 815) states are considered to be too contingent in this particular embodiment. Similarly, if the appointment is aborted (at 840), scheduling ahead is not really applicable. However, this is an implementation specific detail. Alternative embodiments may use all or none of the appointment states as defining events. In the latter case, other types of events may be defined as triggering events, depending on the implementation.

As is apparent from earlier in the discussion, some appointments are scheduled along with "corresponding" appointments on other calendars and the states of these corresponding appointments may also be synchronized. "Corresponding" appointments are appointments booked on different calendars in furtherance of the same activity. The appointments 475a, 475b, 475c in FIG. 4, for example, are "corresponding" appointments for processing the lot 130 in the process tool 115. For example:

a lot appointment and a corresponding lot processing appointment will appear on the lot scheduling calendar and the machine scheduling calendar; respectively;

a PM appointment and a corresponding machine PM appointment will appear on the PM scheduling calendar and machine scheduling calendar, respectively; and a lot load appointment and a corresponding resource load appointment will appear on the lot scheduling calendar and loading resource scheduling calendar, respectively, if a loading operation is required on the process tool for the process operation.

These corresponding appointments are "synchronized," i.e., a change in one appointment triggers the change in the other so that they will have the same characteristics (e.g., start time, end time, etc.). Note that, as appointment change state as discussed above relative to FIG. 8, the change of state needs to be propagated to corresponding appointments on other calendars.

Figure 9:
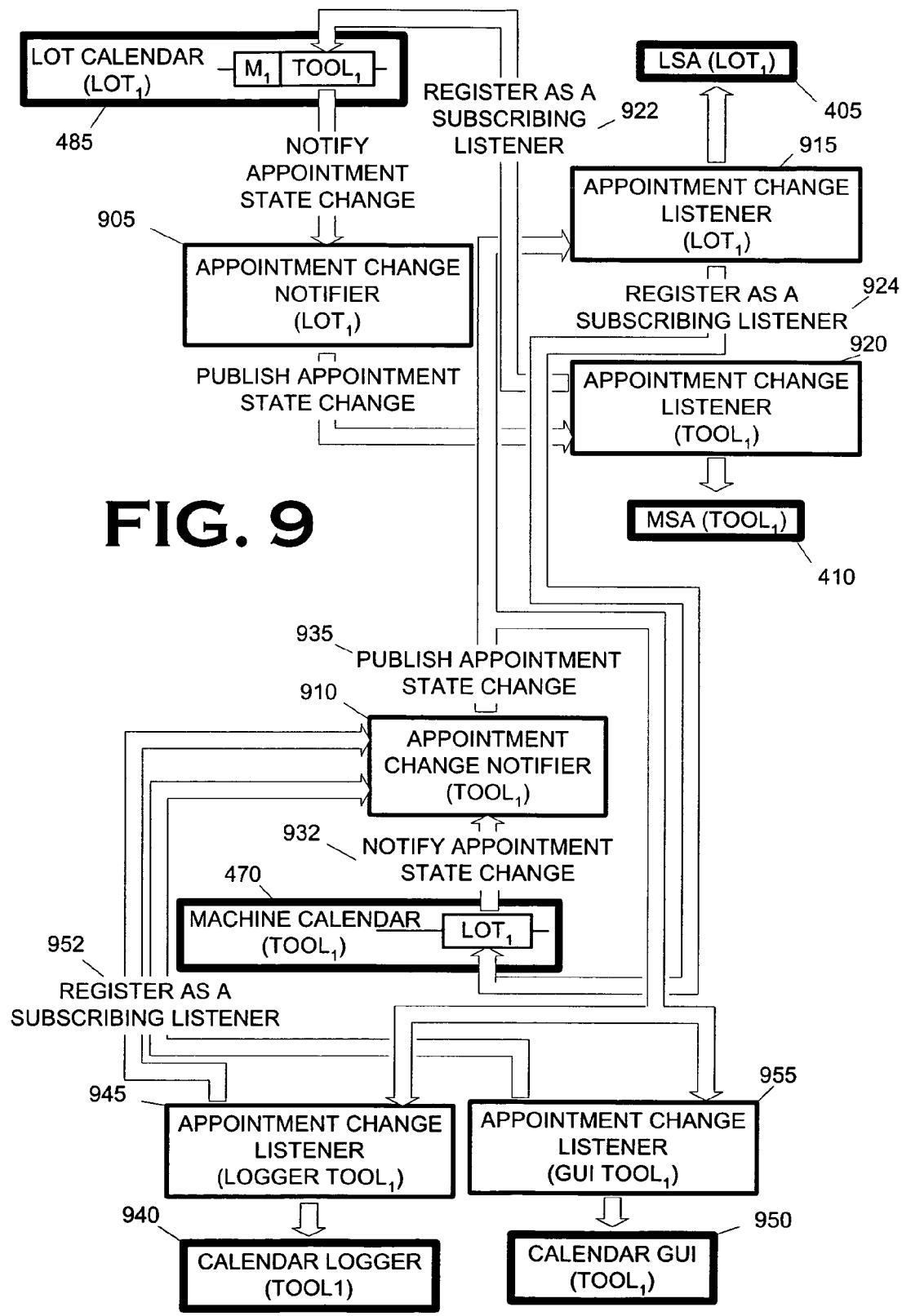
FIG. 9 illustrates the notification mechanism employed in one particular embodiment to keep corresponding appointments on different calendars synchronized.

To communicate the occurrence of events in the process flow 100 and to keep corresponding appointments synchronized, the illustrated embodiment uses an appointment change notification mechanism illustrated more fully in FIG. 9. It is through this notification mechanism that the illustrated embodiment detects that an event has occurred in the process flow. The events communicated by this mechanism include triggering events (i.e., appointment state changes, in the illustrated embodiment). However, the appointment change notification mechanism may also be used to communicate events that are not triggering events. Such is the case in the illustrated embodiment.

FIG. 9 illustrates the mechanism with respect to the LSA 405, lot calendar 485, MSA 410 and the machine calendar 470 of FIG. 4. Note, however, that the mechanism illustrated in FIG. 9 can be extended to any set of calendars and appointments in the process flow 100. Each calendar 485, 470 has a change notifier 905, 910, respectively that publishes changes to its appointments. Each of the corresponding appointments, either on the provider side or on the consumer side, is created with a reference to the respective change notifier 905, 910 for the respective calendar 485, 470 on which it is booked. Each of the scheduling agents 405, 410 maintaining the corresponding appointment has a "change listener" 915, 920, respectively. The change listeners 915, 920 subscribe to appointment changes that are published by the change notifiers 905, 910 that belong to the corresponding appointment on the other side. In FIG. 9, the appointment change listener 915, 920 register (at 922, 924, respectively) with the lot appointment $TOOL_1$ and the lot processing appointment $LOT_1$, respectively, as subscribing listeners.

When the change listener 915, 920 receives a change event about the corresponding appointment on the other side, it will trigger its respective scheduling agent 405, 410 to (1) determine whether the event is a "triggering event" and (2) find the corresponding appointment, and make appropriate adjustment to that appointment so that the appointment(s) on the provider side and consumer side will always keep in synch, if possible. However, the scheduling agent 405, 410 receiving the appointment change may need to react differently. In that case, it makes a different change to its appointment(s) and publishes that change to the listeners 915, 920.

More particularly, when the status of an appointment (e.g., the appointment 475b on the machine calendar 470, in FIG. 4) changes, the provider (e.g., the process tool 115), through its scheduling agent (e.g., the MSA 410), notifies (at 932 in FIG. 9) the respective appointment change notifier (e.g., the change notifier 910). The change notifier of the provider publishes an "appointment change event" (at 935 in FIG. 9) to its subscribing listeners (including the one from the consumer). When the consumer change listener (e.g., the change listener 915) receives the appointment change event, it prompts the consumer scheduling agent (e.g., the LSA 405) to check and see if the appointment change event is a triggering event. If so, then it begins the scheduling effort for the associated target process operation(s), as described above. The consumer change listener also prompts the consumer scheduling agent to make the same change to the corresponding appointment (e.g., the lot appointment 475c) on its respective calendar (e.g., the lot calendar 485).

A slightly different change notification mechanism is used by calendar loggers and calendar "graphic user interface" ("GUI") display tools. In the illustrated embodiment, each calendar (e.g., the machine calendar 470) has a respective calendar logger (e.g., the calendar logger 940) that logs all the changes occurring to the appointments on the calendar. Each calendar logger has an appointment change listener (e.g., the change listener 945) subscribing to the changes on all the appointments (not just one) on the corresponding calendar. The calendar logger and calendar GUI (e.g., the calendar GUI 950) register (e.g., at 952) their listeners directly with the change notifier of the calendar they are listening to, rather than subscribing directly to each individual appointment. This allows the calendar logger and calendar GUI to listen to changes to every appointment on the calendar, including the booking of new appointments.

When one appointment or a set of appointments on the calendar is changed, the change listener will be notified as described above. The change listener will then trigger the calendar logger to log the corresponding change event(s) and dump the calendar. The entire history of a calendar can be recorded in a calendar log file in this manner. WFTs view a calendar using a set of GUI display tools. In this case, every calendar displayed on a computer screen has its own appointment change listener. As in the case of the calendar logger, this change listener is also subscribing to the changes of all the appointments on the displayed calendar. When something changes on the calendar, this change listener will be notified by the change notifier of the appointments, and this in turn will automatically trigger the refresh of the displayed calendar.

Note that, as conditions in the process flow 100 change, other changes can ripple through the process flow 100 and, in particular, the calendars. To avoid undesirable change notification propagation represented by the infinite loop of change notifications, the illustrated embodiment uses a change event registration scheme. More specifically, when a MSA 410 receives a change on a lot appointment, the change event is registered into a list (not shown) for the machine scheduling calendar 470. Later, when the MSA 410 is ready to send a change notification about the corresponding lot processing appointment on its calendar 470, the MSA 410 will first check the list of all the registered change events. In this case, a matched event will be found, and the MSA 410 will interpret the event as a reactive change event coming from the LSA 405. Thus, no further action is required on the machine side, and the MSA 410 will just remove the matched change event from the list. However, non-agent appointment listeners such as the calendar loggers 940 and calendar GUI 950 are always notified of relevant appointment changes. This occurs regardless of whether the change is being initiated or is a reactive change because these types of applications typically listen to only one calendar.

Figure 10:
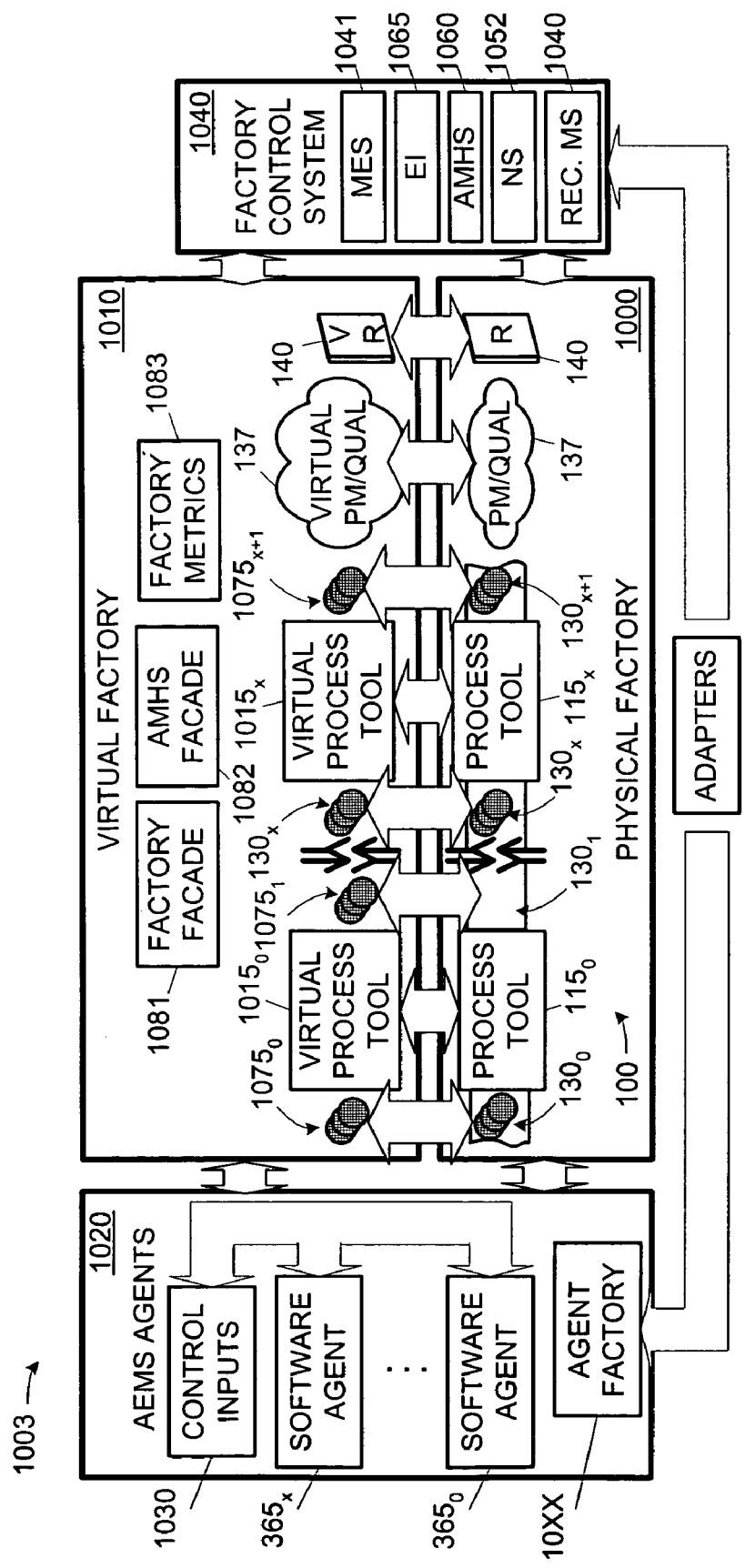
FIG. 10 illustrates the extrapolation of the concepts of the process flow in FIG. 4 to an entire manufacturing process flow to create one particular embodiment of an agent enhanced manufacturing system ("AEMS") in accordance with the present invention.

Heretofore, this detailed description has been directed to the physical factory, or "fab", 1000 of an automated semiconductor fabrication facility ("fab") 1003, shown in FIG. 10. More particularly, FIG. 10 is a block diagram depicting a high-level view of an agent-enhanced manufacturing system ("AEMS") environment, i.e., one in which the use of the software agents 365, shown in FIG. 3, can be implemented factory-wide, including the physical factory (or "fab") 1000, an AEMS virtual factory 1010, a group 1020 of AEMS agents 365, and a factory control system ("FCS") 1040.

In order to implement an agent-enhanced scheduling and control system for semiconductor processing, the system collects information concerning conditions in the physical factory 1000. On initialization of the software agents 365 and the virtual factory 1010, the virtual factory 1010 is populated with the state and definition of the physical factory 1000. The definition of the factory includes, among other things, the:

- identities and states of the lots 130;
- identities and states of the process tools 1015 in the process flow 103;
- types of operations each process tool 1015 performs i.e., the capabilities of each process tool 1015;
- the ports (not shown) on which the process tools 1015 may receive and output the lots 130;
- identities of the resources 140 in the process flow;
- type of operations in which each resource 140 may be used; and
- repositories (not shown) of specifications for, e.g., repairs, PM procedures, and Qual procedures.

The MES 1041, equipment interfaces ("EIs") 1065, AMHS 1060, and simulation models (not shown) provide details comprising the definition and state of the physical factory 1000, and this information is assimilated into a data store that is the virtual factory 1010.

However, as operations begin, the state of the physical factory 1000 changes. Periodically, so does the definition as process tools 1015 and resources 140 are removed from or added to the process flow. Thus, the virtual factory 1010 collects information regarding real-time transactions in the physical factory 1000 (shown in FIG. 10) through the FCS 1040 and publishes state changes for the components of the AEMS 1020. The state changes are published through a set of "notifiers." One example of this process was disclosed relative to FIG. 9, in which appointment state changes were communicated. The virtual factory 1010 is updated by the information published by other notifiers in the physical factory 1000 (not shown) that are received by virtual factory listeners such as MES listeners, AMHS listeners, and equipment event listeners.

The virtual factory 1010 also contains objects corresponding to the physical elements of a physical factory 1000, i.e., the manufacturing domain entities. The virtual factory 1010 includes objects representing lots 130, process tools 1015, resources 140, and other manufacturing domain entities. Note, however, that the software agents 365 do not necessarily exist in a one-to-one correspondence with manufacturing domain entities, such as lots, equipment, etc. Instead, most manufacturing domain entities are each represented by more than one agent as mentioned above. For instance, each lot 130, process tool 1015, resource (e.g., the reticle 408, shown in FIG. 4), and tool PM will each have both a scheduling agent and a processing agent.

The virtual factory 1010 may be implemented as a data store encoded on some form of storage and may be of any suitable structure known to the art, or even several data structures (not shown). The virtual factory 1010 is also used to store a wide variety of information that may assist in providing automated material handling for the physical factory 1000, including the:

- identities of stockers (not shown) and WIP racks (not shown);
- association of the nearest stocker to a process tool 1015;
- association of the nearest WIP rack to a process tool 1015;
- duration of moves from any given source to any given destination location;
- location of lots 130, carriers (not shown) or other resources;
- identities of carriers; and
- associations between lots 130 and carriers.

The virtual factory 1010 also includes a store 1083 of factory metrics. This store contains data pertinent to the duration of appointments used by the scheduling agents to accurately schedule appointments. Thus, the virtual factory 1010 contains data indicating the definition and state of the AMHS 1060 and the status of the physical factory 1000 as a whole.

For instance, FIG. 10 shows the physical factory 1000 containing representative tools including a process tool $115_0$, a process tool $115_1$, and a process tool $115_x$, as well as several lots 130 of wafers. The virtual factory 1010 consequently includes a virtual process tool $1015_0$, a virtual process tool $1015_1$, a virtual process tool $1015_2$, and virtual lots 1075 corresponding thereto. The virtual process tool $1015_0$, a virtual process tool $1015_1$, a virtual process tool $1015_2$, and virtual lots 1075, are objects representative of the state of the process tool $115_0$, process tool $115_1$, process tool $115_x$, and lots 130, respectively, in the physical factory 1000. The AEMS 1020 can consequently obtain information about the state of the process tool $115_0$, process tool $115_1$, process tool $115_x$, and lots 130 by accessing the corresponding virtual process tool $1015_0$, virtual process tool $1015_1$, virtual process tool $1015_2$, and virtual lots 1075 in the virtual factory 1010.

More precisely, the virtual factory 1010 contains a number of relevant specifications and state of the physical factory 1000. This includes product/process definitions, separated into "collections," that are grouped into a factory façade 1081, that are provided to the components of the AEMS 1020 as needed. One particular embodiment of the factory façade 1081 includes a plurality of "collections" and "repositories" of information set forth in Table 4.

TABLE 4

Virtual Factory Collections and Repositories

| Collection or Repository | Description |
|---|---|
| Lot Collection | Provides access to lots and their state as they are added to, removed from, and filtered in the process flow of the physical factory and includes a plurality of lot definitions. |
| Machine Type Collection | Provides access to machine types as they are added and removed from the process flow of the physical factory. |
| Machine Collection | Provides access to process tools and their state as they are added to and removed from the process flow of the physical factory, and includes a lurality of machine definitions, each of which includes. |
| Resource Type Collection | Provides access to resource types as they are added and removed from the process flow of the physical factory. |
| Resource Collection | Provides access to resources 140 and their state as they are added to and removed from the process flow of the physical factory, and includes a plurality of resource definitions. |
| Product Collection | Provides access to products as they are added to and removed from the process flow of the physical factory, and includes a plurality of product definitions. |
| Process Collection | Provides access to processes as they are added to and removed from the process flow of the physical factory, and includes a plurality of process definitions. |
| Repair Specifications | Contains information regarding repairs in the repair collection. |

TABLE 4-continued

Virtual Factory Collections and Repositories

| Collection or Repository | Description |
|---|---|
| Repository Qual Specifications Repository | Contains information regarding Qual procedures in the Qual collection. |
| PM Specifications Repository | Contains information regarding PM procedures in the PM collection. |

Figure 11A:
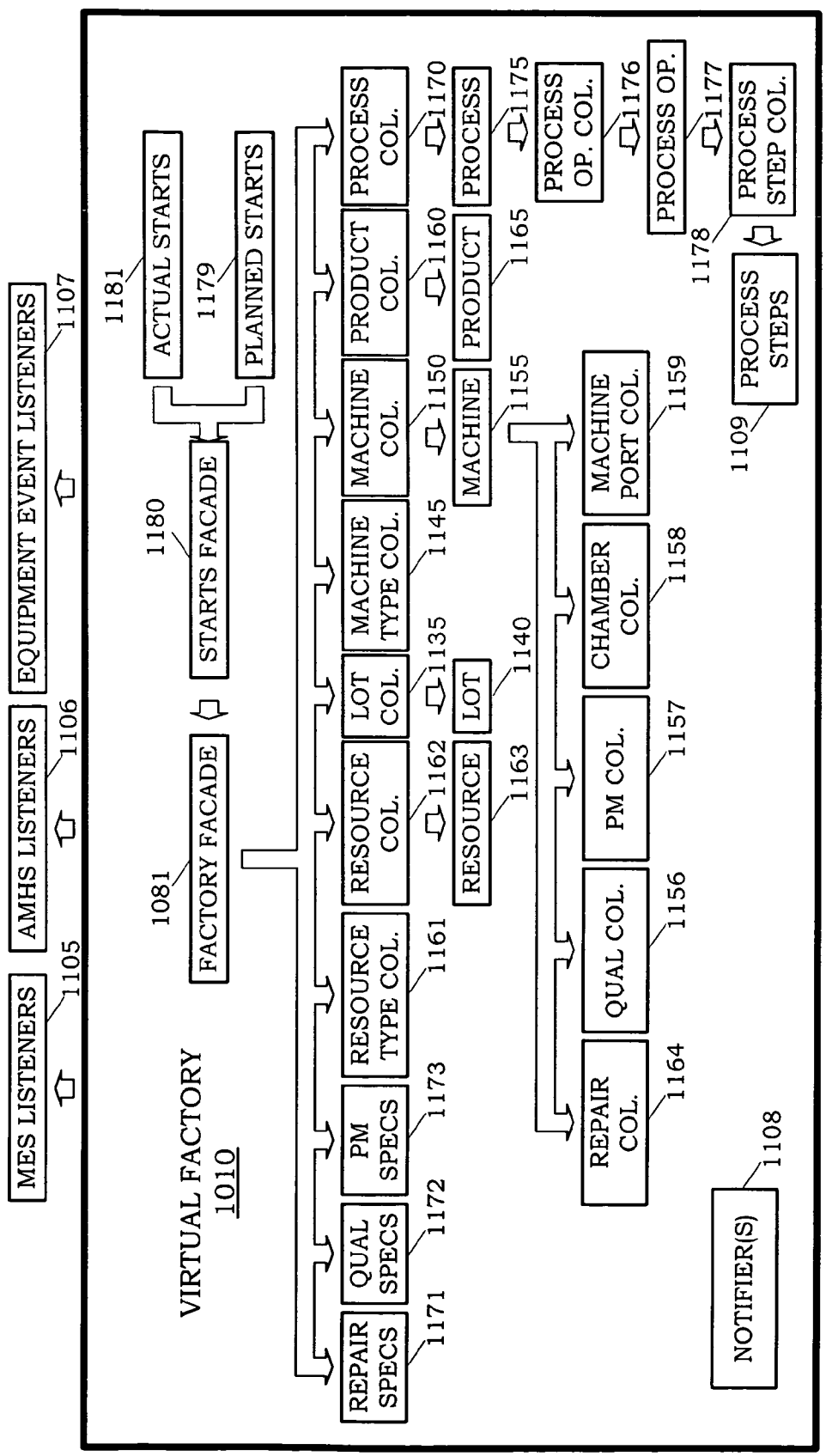
FIG. 11A-FIG. 11D conceptually illustrate the organization and application of the virtual factory in the AEMS of FIG. 10.

One particular embodiment of the factory façade 1081 is illustrated in FIG. 11A and includes:
- a lot collection 1135 that provides access to lots 130 and their state as they are added to, removed from, and filtered in the process flow of the factory 1000 and includes a plurality of lot definitions 1140;
- a machine type collection 1145 that provides access to machine types as they are added and removed from the process flow of the factory 1000;
- a machine collection 1150 that provides access to process tools 115 and their state as they are added to and removed from the process flow of the factory 1000, and includes a plurality of machine definitions 1155, each of which includes:
- a resource type collection 1161 that provides access to resource types as they are added and removed from the process flow of the factory 1000;
- a resource collection 1162 that provides access to resources 102 and their state as they are added to and removed from the process flow of the factory 1000, and includes a plurality of resource definitions 1163;
- a product collection 1160 that provides access to products as they are added to and removed from the process flow of the factory 1000, and includes a plurality of product definitions 1165;
- a process collection 1170 that provides access to processes as they are added to and removed from the process flow of the factory 1000, and includes a plurality of process definitions 1175;
- a repository of repair specifications 1171 containing information regarding repairs in the repair collection 1164;
- a repository of Qual specifications 1172 containing information regarding Qual procedures in the Qual collection 1156; and
- a repository of PM specifications 1173 containing information regarding PM procedures in the PM collection 1157.

Note that each machine definition 1155 comprises:
- a repair collection 1164 regarding repairs for the particular machine definition 1155;
- a Qual collection 1156, defining the qualifications for the respective machine definition 1155;
- a PM collection 1157, defining the preventive maintenance for the respective machine definition 1155;
- a chamber collection 1158, defining the chambers for the respective machine definition 1155; and
- a machine port collection 1159 defining the ports for the respective machine definition 1155.

Similarly, the process definition 1175 includes a process operation collection 1176 comprising a plurality of process operations 1177, each of which comprises a process step collection 1178, or group of process steps 1109 that define the process operation 1177. Note that the process steps 1109 include collections (not shown) of certified machines and resources for the process steps 1109. The virtual factory 1010 also includes a starts façade 1180 that provides planned and actual starts 1179, 1181 of products 1165 into the factory 1000 to the factory façade 1081.

The triggering event and time offset information used in implementing the invention is stored in the factory façade 1081. In the illustrated embodiment, triggering events and time offsets for a given process operation are determined a priori and stored among the collections of the factory façade 1081. This information comprises a portion of the factory definition that is a part of the virtual factory 1010. For a given process operation in the process flow, the factory definition in the virtual factory 1010 contains a set of target process operations for scheduling ahead and their associate triggering events and time offsets. Thus, a scheduling agent can determine the triggering events and time offsets for the current process operation by accessing the factory definition.

Figure 11B:
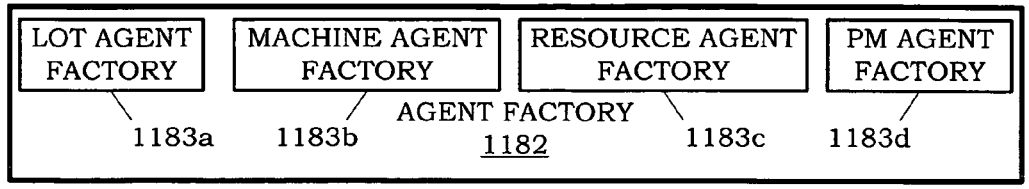
Figure 11C:
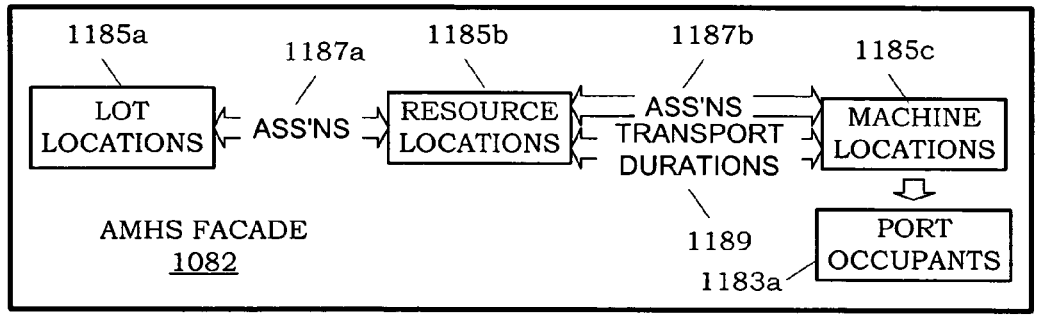

Returning to FIG. 10, the virtual factory 1010 of the illustrated embodiment also includes an AMHS façade 1082 that, in conjunction with the factory façade 1081, contains the factory definition and factory state. Note that, in some embodiments, the AMHS façade 1082 may be external to the virtual factory 1010. The AMHS façade 1082, as is shown in FIG. 11C, stores lot locations 1185*a*, resource locations 1185*b*, and machine locations 1185*c*. The AMHS façade 1082 also includes the associations 1187*a*, 1187*b* among the lot location 1185*a* and pertinent resource locations 1185*b* and among the pertinent resource locations 1185*b* and the machine locations 1185*c*. The transport durations 1189 from any source location to any destination location are also included. The AMHS façade 1082 also includes the identity and location of storage units (e.g., stockers, WIP racks (not shown)). Thus, the AEMS 1020 can identify which WIP rack (not shown) or stocker (not shown) is closest to a process tool 115.

Figure 11D:
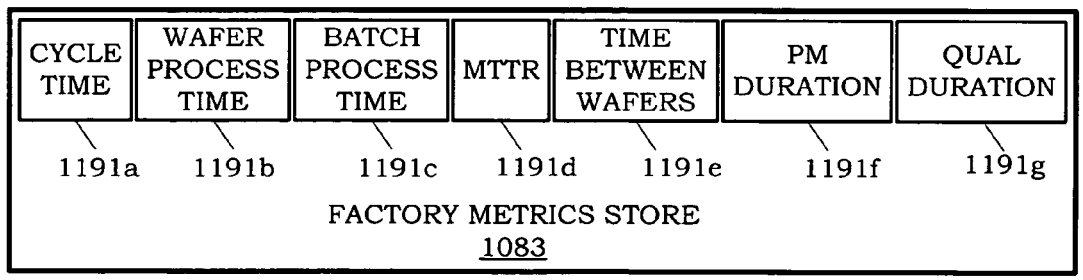

In the illustrated embodiment, the virtual factory 1010 also includes a store of factory metrics 1083. These factory metrics includes, as shown in FIG. 11D:
- cycle time 1191*a*, by process, operation, and priority;
- wafer process time 1191*b*, by machine, process, and number of chambers;
- batch process time 1191*c*, by machine and recipe;
- mean time to repair ("MTTR") 1191*d*, by machine;
- time between wafers 1191*e*, by machine;
- PM duration 1191*f*, by machine and PM; and
- Qual duration 1191*g*, by machine and Qual.

The metrics can be used to provide more specific durations required by the software agents 365 for accurate scheduling of various types of appointments. They can also be used in scheduling wafer-based PMs or Quals. Other embodiments may use other information in addition to or in lieu of those listed above or may omit such information altogether.

Still referring to FIG. 10, the plurality 1020 of software agents 365 comprises a number of software components defined by a number of classes summarized in Table 5. Alternative embodiments may employ still other classes. In the illustrated embodiment, some of the agent classes include still further subclasses (not shown). For instance, the MSA class and MPA class may include subclasses defined by the type of processes they perform and/or by whether they process lots 130 or batches of lots 130. Similarly, the RSA class and the RPA class may contain subclasses defined by the type of resource they represent. These subclasses accommodate differences in behavior among various types of process tools 1015 and resources arising from these particular characteristics. However, the use of such subclasses is not necessary to the practice of the invention, and may be omitted in some embodiments.

TABLE 5

Agent Classes, Subclasses, and Definitions

| Agent Class | Agent Subclass | Subclass Definition |
|---|---|---|
| Scheduling Agent Class | LSA | Schedule appointments on behalf of a specified lot. |
| | MSA | Schedule appointments with other scheduling agents on behalf of a specified process tool. |
| | RSA | Schedule appointments with other scheduling agents on behalf of a resource. |
| | PM Scheduling Agents ("PMSAs") | Schedule specified PM and Qual appointments on behalf of PM or Qual procedures for a specified process tool and, sometimes, with RSAs for use of a resource during the PM or Qual appointment. |
| Processing Agent | Lot Processing Agents ("LPAs") | Initiate execution of move appointments. |
| | Machine Processing Agents ("MPAs") | Initiate execution of setup and lot processing (including downloading recipes and performing MES transactions). |
| | Resource Processing Agents ("RPAs") | Initiate execution of scheduled activities for resources, such as processing appointments, loads, unloads, and transports. |
| | PM Processing Agents ("PMPAs") | Initiate execution of PM and Qual appointments by, for example, notifying maintenance technicians to perform PMs or Quals. |
| Starvation Avoidance Lot Start Agent ("SALSA") | SALSA | Determines when new lots are introduced into the process flow of the physical factory and initiates their introduction into the process flow. |

As mentioned, the SALSA agent class determines when new lots 130 are released into the process flow of the factory. More particularly, the SALSA agent monitors work in process ("WIP") in the process flow and identifies one or more workstations or process tools 115 that create bottlenecks in the process flow. The SALSA calculates a WIP value representing the amount of work approaching each bottleneck workstation and determines whether the WIP value is projected to fall below a control limit during an evaluation period. If the WIP value is projected to fall below the control limit during the evaluation period, a selected amount of additional work is released into the manufacturing line. In some implementations, the SALSA even determines which products and the quantities of those products to introduce, and then initiates their introduction. Note, however, that the SALSA can, in some embodiments, release lots in accordance with a work production schedule.

The AEMS 1020 also includes a number of software components that facilitate the functionality of the software agents 365. In the illustrated embodiment, these additional software components can be generally categorized as an alarm service (not shown) that provides time to AEMS 1020 components, and provides the ability to set an alarm for a specified time or period and to have a callback invoked on a specified listener at that time; adapters 1046 that provide interfaces to other FCS, e.g., the MES 1041, the EI 1065, the AMHS 1060, a notification system 1052, and recipe management system 1040; and helpers (not shown) used by the software agents 365 to accomplish their functions. The adapters and helpers are implemented in several varieties summarized and described in Table 6 below. Still other helper class components may be employed in various embodiments.

TABLE 6

Additional Software Components and Descriptions

| Component Type | Variety | Description |
|---|---|---|
| Adapter | MES Adapters | Interface with the MES to automatically perform MES transactions, e.g., track-in/out lot or machine, put lot on hold, etc. |
| | EI Adapters | Send commands to equipment interfaces (e.g., download recipes, request tool status, etc.) and that receive event information from equipment interfaces via equipment event dispatchers. |
| | AMHS Adapter | Sends move commands to the AMHS. |
| | Recipe Management System ("RMS") Adapter | Provides a recipe name for a specified processing context (i.e., lot, product, tool, process, operation). |
| | Notification Adapter | Sends various forms of notification (e.g., screen, pager, e-mail, etc.) to fab personnel (e.g., WFTs). |
| Helper | Cost Calculators | Calculate various quantities (e.g., lot budget calculator, critical ratio calculator, bid cost calculator). |
| | Alarm Managers | Create and clear alarms used for notification of schedules appointment start and completion times. |
| | Schedulers | Schedule various events or appointment types. |
| | Notifiers | Notify subscribing listeners of the occurrence of an event (e.g., appoint change notifiers). |
| | Listeners | Detect and report the occurrence of selected events or changes in state (e.g., lot listeners, bid listeners, AMHS listeners, alarm listeners). |
| | Bid Negotiators | Negotiate bids. |
| | Calendars | Book, track, and manipulate appointments. |

Note that some embodiments may distribute the functionality of the software components differently than does the illustrated embodiment. For instance, in some embodiments, the functionality of the processing agents may instead be implemented in helper class objects called by the scheduling agents. Thus, the distribution of functionality across the software components of the illustrated embodiment is exemplary and illustrative only, and not necessarily limiting.

The illustrated embodiment permits configurability of the software agents 365. More particularly, the processing and scheduling actions of the software agents 365 are scripted such that certain, predefined events cause execution of a script segment. Exemplary events include, but are not limited to, arrival of a carrier, completion of a wafer, completion of a process, etc. Editing these scripts "configures" the behavior of the software agents 365 by controlling how they react to selected events. Thus, a user can provide "rules" governing the behavior of the software agents 365. Alternatively, parameters or properties of the software agents 365 may be externally set to configure the software agents 365 and provide flexibility and/or system tuning. For instance, some properties specify curves that guide system decisions, e.g., cost-of-lateness, congestion fee, urgency, bumping fee, PM budget, and lot budget. Some parameters are agent controls, such as bottleneck machine types, work in progress ("WIP") safety factor, start batch size, etc. Some control knobs might be considered to be "miscellaneous properties" because they are not easily grouped elsewhere. Examples of this type of property include files paths and message types. Setting these types of parameters/properties can also configure the software agents 365.

In the illustrated embodiment, the software agents 365 are "dynamically" configurable. Values for properties are stored in a file stored, e.g., in the storage 310 shown in FIG. 3. In conventional systems, the values are loaded from the file and cached whenever the system initializes or "boots up." The cached value is used in subsequent execution until such time the system initializes or boots up again. In the illustrated embodiment, however, whenever a value is used, the date of the properties file is checked and, if more recent than the last initialization, the value is reloaded from the properties file. Alternatively, the value may be reloaded every time from the properties file. Thus, the illustrated embodiment does not simply load and cache the value. Consequently, the properties are dynamically configurable in the sense that the software agents 365 can update the value any time the property is used and need not wait for the next system initialization or reboot.

Returning to FIG. 10, an agent factory 1182 maintains and controls the population of software agents 365 in the AEMS 1020. In the illustrated embodiment, the agent factory 1182 comprises, as shown in FIG. 11B, a lot agent factory 1183a, a machine agent factory 1183b, a resources agent factor 1183c, and a PM agent factory 1183d. The agent factories 1183a, 1183b, 1183c, 1183d are responsible for creating and maintaining the appropriate population of agents. The agent factories 1183a, 1183b, 1183c, 1183d subscribe to changes to the respective collections 1135, 1150, and 1162 (shown in FIG. 11A), e.g., lots 130 being added or removed from the factory 1000. When a change occurs to a collection, the respective agent factory 1183a, 1183b, 1183c, or 1183d creates or terminates the scheduling and processing agents for the manufacturing domain entity implicated by the change. This same technique is used to populate the AEMS 1020 with software agents 1020 during initialization of the system.

In operation, when the AEMS 1020 is initialized, the software agents must "discover" their current state. For instance, a LSA 402 in FIG. 4 determines if its current location is on a process tool 1015 or a machine port, i.e., if it is waiting to process, if it is currently processing or if it has completed processing and is waiting to be moved out. Depending on the status upon discovery, the LSA 402 may schedule different activities. If processing, the LSA 402 will schedule an "active" processing appointment with an appropriate MSA 404 for the expected time remaining in the processing. If not processing, then the LSA 402 will schedule an "inactive" processing appointment. If processing is completed, the LSA 402 will schedule a move appointment. Other types of software agents, e.g., machine and PMSAs, have similar discovery procedures upon start-up. Note that, for the LSA 402 discussed above to schedule an active appointment on discovery, the MSA 404 discovers the degree of completion of processing (e.g., how many wafers 135 have been processed on a wafer-based process tool 1015) to determine an accurate duration for the appointment. The detailed information needed for discovery is obtained from the virtual factory 1010 and the tool status in the physical factory 1000 via the equipment interface ("EI") 1065.

As part of the initialization process, the individual scheduling software agents 365 check to see whether a triggering event occurred prior to initialization. Since the consumer is aware of its progress through the process flow 100, the scheduling agents 365 can retrieve information regarding previous process operations from the virtual factory 1010. This information will include associated triggering events. The occurrence of any triggering events can be extrapolated from information such as the current progress through the process flow 100. If a triggering event occurred, then the scheduling software agents 365 must determine whether the target process operation has been scheduled or needs to be scheduled. If it needs to be scheduled, then the software scheduling agent 365 begins the scheduling process described above relative to FIG. 4. This information is a part of the factory state, and so is stored on the virtual factory 1010 where it can be easily retrieved.

Figure 12A:
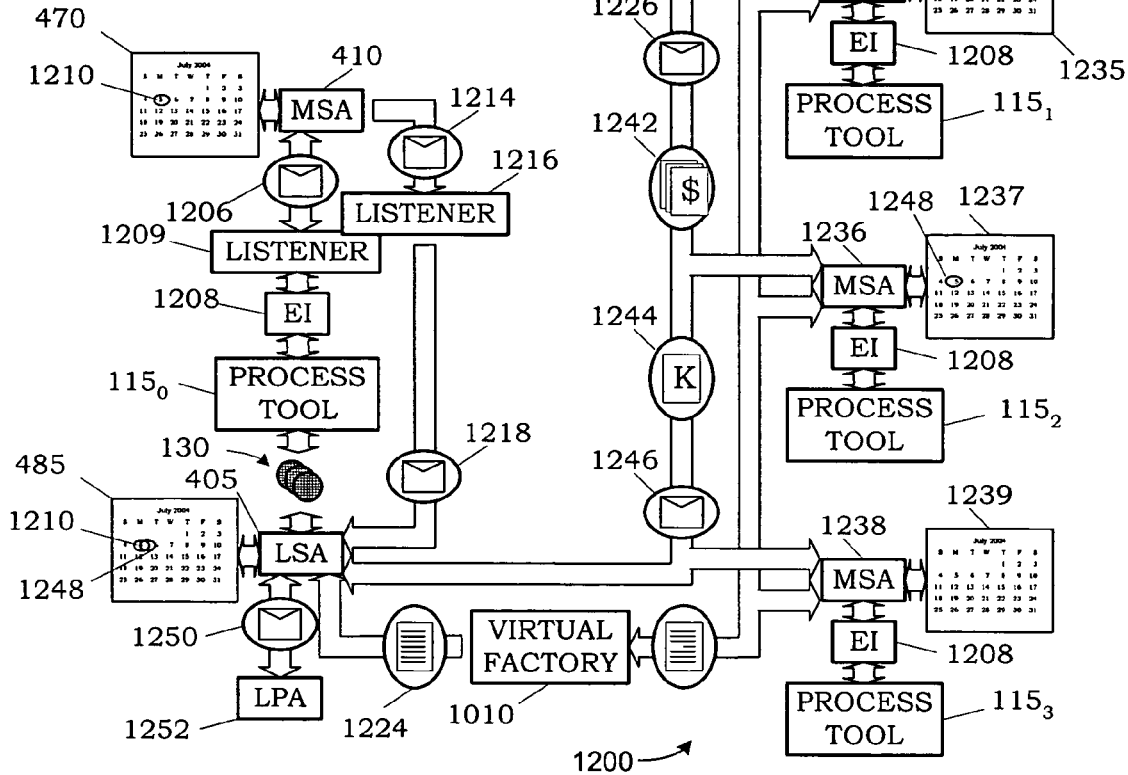
FIG. 12A-FIG. 12B conceptually illustrate representative scheduling and processing scenarios, respectively, including the AEMS of FIG. 10 in accordance with one particular embodiment of the present invention.
Figure 12B:
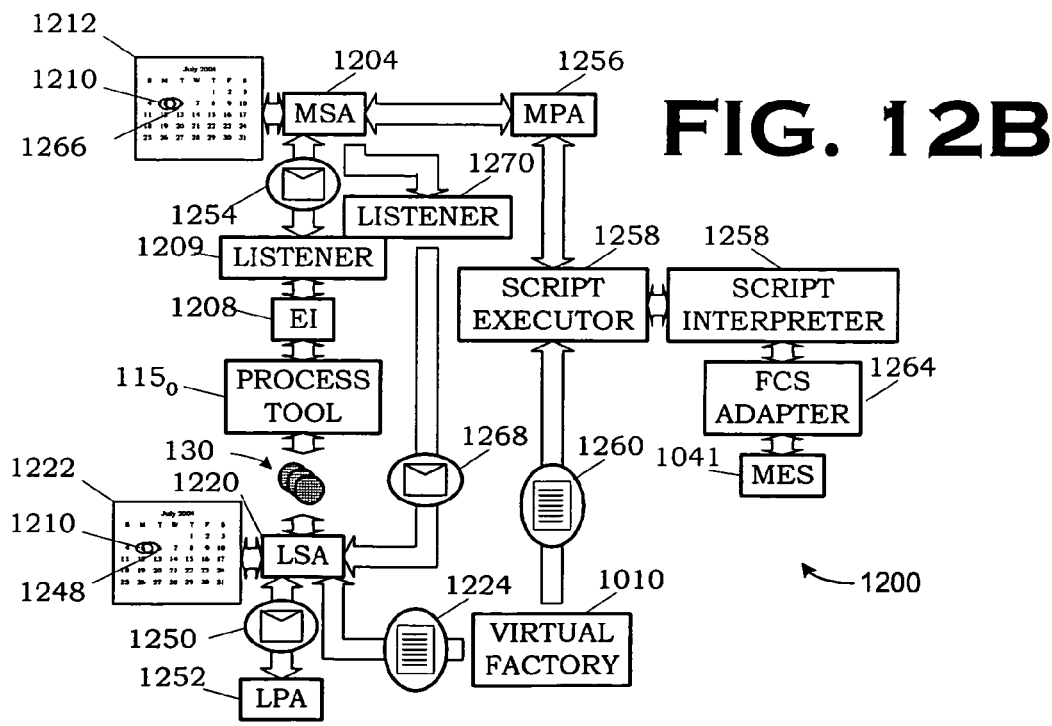

The scheduling agents 365 then begin initial scheduling for the lots 130 and transitions into general scheduling using a contract net negotiation protocol discussed above. FIG. 12A, FIG. 12B present exemplary general scheduling and processing scenarios, respectively, in which the software agents 365 in the AEMS 1020 in FIG. 10 cooperate in one portion 1200 of a process flow in the physical factory 1000. These scenarios also illuminate the interaction between the physical factory 1000, the AEMS 1020, and the factory control system 1040.

Turning now to FIG. 12A, as a lot 130 nears completion of a current operation on the process tool $1215_0$, the MSA 410 for the process tool $1215_0$ receives a "near complete" message 1206 from the process tool $1215_0$'s EI equipment interface 1208 through the listener 1209. (The EI 1208 is a part of the EI 1065, shown in FIG. 10, of the factory control system 1040.) The MSA 410 updates the state of the appointment 1210 on its calendar 470 and recalculates the end time for the appointment 1210. The MSA 410 sends a notice 1214 to notify the appointment change listener 1216 as it updates the appointment 1210 that the lot 130 is nearing completion of the operation.

The listener 1216, in turn, sends a change notification 1218 to the LSA 405 for the lot 130 to indicate that the end time and the state for the appointment 1210 has been modified. The LSA 405 then updates the appointment 1210 on its calendar 485 and retrieves data 1224 regarding the next process operation from the virtual factory 1010. The LSA 405 also determines whether the event reported in the change notification 1218 is a triggering event. For purposes of illustration, assume that the change of state to "near complete" is a triggering event. This is a part of the information retrieved from the virtual factory 1010, which also includes the time offset and the target process operation. The LSA 405 then sets an alarm for the expiration of the time offset.

On expiration of the time offset, the alarm fires. The firing of the alarm triggers the LSA 405 to begin scheduling the target process operation. The LSA 405 then publishes a bid request 1026 to the MSAs 1234, 1236, 1238 of the process tools $115_1$, $115_2$, $115_3$ that have subscribed to receive bid requests for the process operation requested by the LSA 405, as previously discussed. The MSAs 1234, 1236, 1238 retrieve data 1240 such as wafer processing times, move durations, and lot status from the virtual factory 1010 and examine their respective calendars 1235, 1237, 1239. The MSAs 1234, 1236, 1238 then formulate and submit bids 1242 as discussed above. The LSA 405 then selects one of the bids as discussed above and sends a confirm bid message 1244 to the MSA 1234, 1236, 1238 that submitted the selected bid 1242. The MSA 1234, 1236, 1238 then confirms the award, books the appointment 1248, and sends the LSA 405 a contract confirmed message 1246.

The LSA 405 then books the new appointment 1248 on its calendar 485. The LSA 405 then schedules move appointments, for example, from the process tool 1215$_0$ to stockers (not shown) and from the stockers to the next process tool 115$_1$, 115$_2$, 115$_3$ with whom the new appointment 1248 is scheduled. The LSA 405 schedules move appointments so that the lot 130 it represents arrives in time for its load or processing appointment. Thus, the LSA 405 schedules move appointments in light of the time remaining before its next load/processing appointment. Once the move appointments are scheduled, if it is time to begin the move, the LSA 405 initiates the start of the move. If not, then the LSA 405 sets an alarm for the start time. Note that, during this scheduling process, the LSA 405 is also scheduling maximum move and feeder appointments 753, 752 as warranted to explicitly constrain the scheduling of the target process operation. When the start time for the move appointment 1248 arrives and the alarm fires, then the LSA 405 initiates the move. The LSA 405 sends a notification 1250 to the LPA 1252 responsible for processing the lot 130 through the new appointment 1248.

Turning now to FIG. 12B, when processing for the current lot is completed, the process tool 1215$_0$ sends a notification 1254 to the MSA 410 through the EI 1208. The MSA 410 then notifies the MPA 1256. The MPA 1256 calls a script executor 1258 that retrieves a script 1260 from the virtual factory 1010. The script executor 1258 calls a script interpreter 1262 that, through the FCS adapter 1264, implements the script 1260 in the MES 1041. The MSA 410 then updates the state of the appointment 1210, cancels any alarms, and pulls in the next appointment 1266 for the process tool 1215$_0$.

The LSA 405 receives an appointment change notification 1268 via a listener 1270 when the MSA 410 updates the state of the appointment 1210. The LSA 405 determines whether the event reported in the change notification 1218 is a triggering event. For purposes of illustration, assume that the change of state to "complete" is a triggering event. This is a part of the information retrieved from the virtual factory 1010, which also includes the time offset and the target process operation. The LSA 405 then sets an alarm for the expiration of the time offset. On expiration of the time offset, the alarm fires. The firing of the alarm triggers the LSA 405 to begin scheduling the target process operation as is discussed above relative to the change of appointment state to "near complete."

The LSA 405 also notifies the LPA 1252 that the processing has been completed, as indicated by the notification 1268, and updates the appointment 1210 on the calendar 485. The LPA 1252, upon notification that processing is complete, calls and executes a script (not shown) in a manner analogous to that of the MPA 1256 calling and executing the script 1260 to act upon the completion of the processing. After updating the appointment 1210, the LSA 405 examines its calendar 485. If it is time for the appointment 1248 to start, the LSA 405 notifies the LPA 1252 to execute a move appointment to position the lot 130 for the lot 130's next appointment 1248. If it is not time to start, then the LSA 405 sets an alarm for the start time. When the alarm fires, the LSA 405 then notifies the LPA 1252.

The scheduling scenario presented in FIG. 12A and the processing scenario in FIG. 12B are representative of the conduct of the process flow for the physical factory 1000 employing the AEMS 1020. Those skilled in the art having the benefit of this disclosure will be able to readily extrapolate those scenarios to other parts of the process flow's operation, e.g., the scheduling and processing of a resource (e.g., a reticle, cassette, dummy wafer) by a process tool. Note also, that software agents 365, depending on their role in the AEMS 1020, may react to a number of events in the FCS 1040 such as carriers arriving; carriers departing; processing starting; wafer completion; lot, machine, and chamber state change (priority, wafer count, hold, availability); move started; move completed; definition changes (product, process, operation); and collection changes (lot/machine added or removed).

Furthermore, as was noted above, the invention admits wide variation in, e.g., scheduling. Although the illustrated embodiment employs a contract net negotiation protocol but alternative embodiments may employ alternative protocols, also as was noted above. Other alternatives may also be employed in addition to, or in lieu of, aspects previously set forth. Some embodiments may employ calendaring techniques to facilitate the scheduling process, for example, by opening slots on calendars.

For instance, booked appointments may be shifted. As mentioned above, most appointments have a commitment window. Appointments may be viewed as "beads on a string." Existing appointments are permitted to slide backward or forward within their respective commitment windows as necessary to provide a calendar with flexibility that in turn permits the scheduling agent to create a more efficient schedule and react to unexpected events. In the illustrated embodiment, to simplify the logic, appointments are not permitted to shift past the next appointment in either direction.

Figure 13:
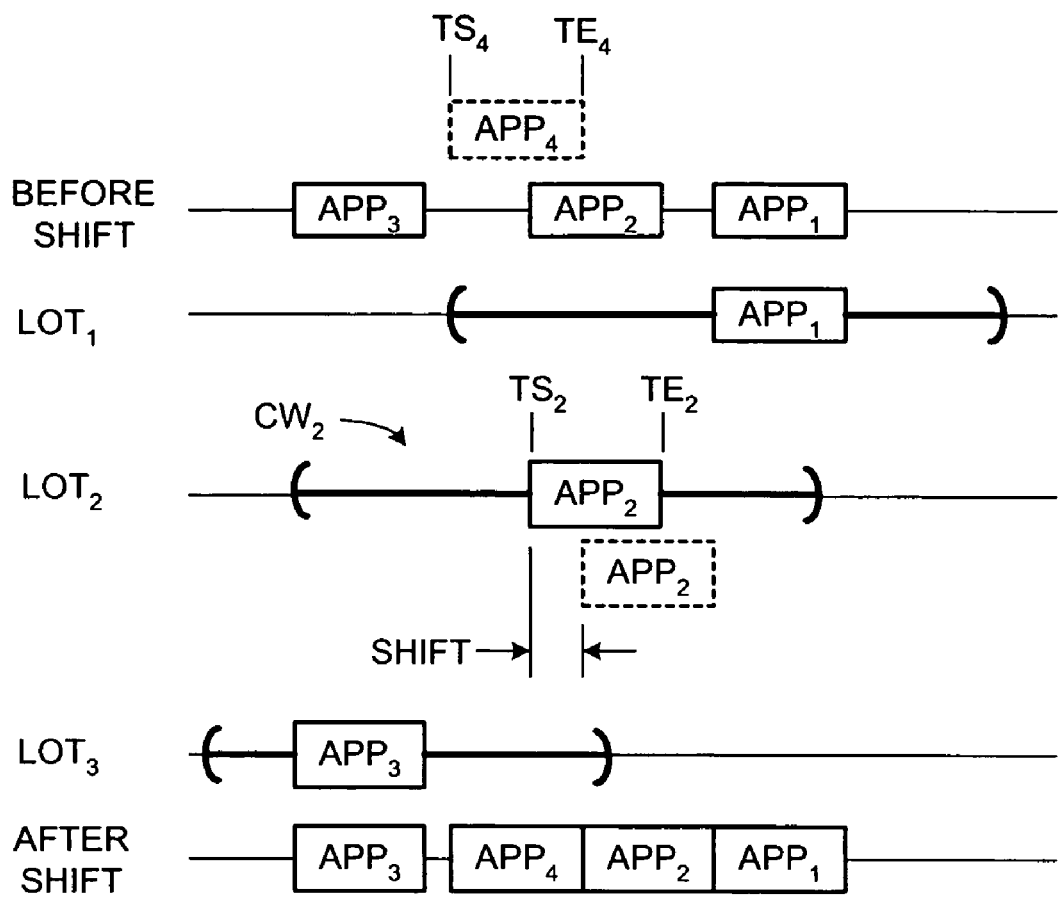
FIG. 13 conceptually illustrates how booked appointments may be shifted to accommodate the scheduling of a new appointment.

Consider, for example, the calendar conceptually illustrated in FIG. 13. The calendar has three appointments APP$_1$-APP$_3$ booked for three lots LOT$_1$-LOT$_3$, respectively. Note that each appointment APP$_1$-APP$_3$ is booked within a corresponding commitment window CW$_1$-CW$_3$, respectively. Assume that the provider for whom this schedule is maintained wishes to schedule the APP$_4$ for the LOT$_4$. The proposed appointment time slot [TS$_4$, TE$_4$] conflicts with the scheduled appointment time [TS$_2$, TE$_2$] for the booked appointment APP$_2$. However, the appointment APP$_2$ has ample room within its commitment window CW$_2$ within which to shift so that the appointment APP$_4$ can still be scheduled. In this particular example, the appointment APP$_2$ is shifted right, or later in time, within its commitment window CW$_2$ so that the appointment APP$_4$ may be scheduled and booked.

Figure 14:
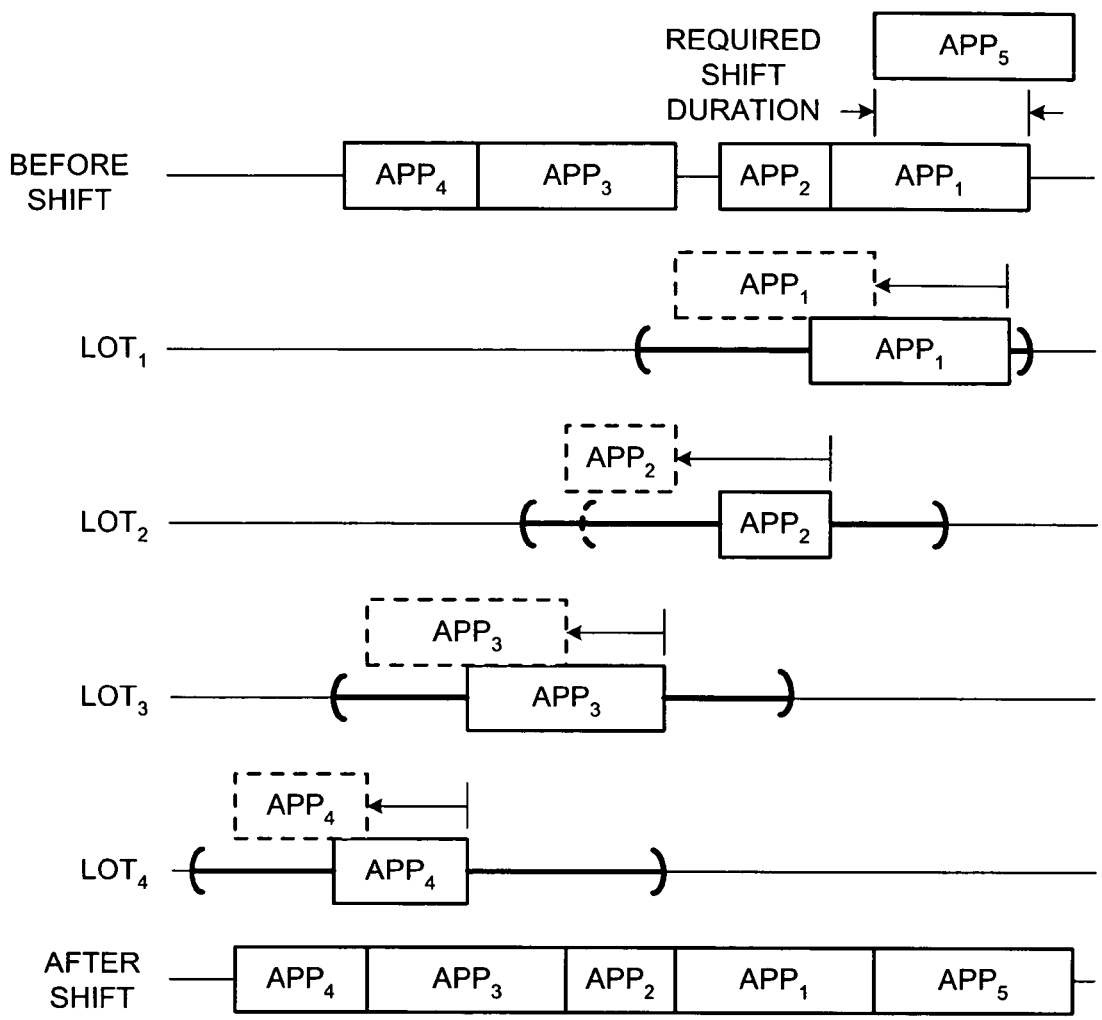
FIG. 14 conceptually illustrates a "cascade shift left" of booked appointments to accommodate the scheduling of a new appointment.

The shifting can also be more complex than just shifting a single booked appointment. One such situation is shown in FIG. 14, wherein several booked appointments are shifted in a "cascading" fashion to accommodate the scheduling of a new appointment APP$_5$. In FIG. 14, the new appointment APP$_5$ seeks to schedule at the time for which the appointment APP$_1$ is already booked. In this case, the commitment windows of all the booked appointments APP$_1$-APP$_4$ are ample enough to allow them to shift left (to an earlier time) in a "cascading" fashion to allocate the time slot for the new appointment APP$_5$. A more complicated and powerful shifting routine formed by combining a sequence of "cascading left shift" and "cascading right shift" moves can be used to open a time slot on the calendar for a new appointment.

In these embodiments, to prevent undesirable appointment shifting, the illustrated embodiment employs a locking mechanism. Generally speaking, when a lot 130 starts its final move from a source location to a machine port of the process tool 115, it is undesirable to have a new appointment jumping in front of it by canceling or shifting that appointment to the right, or later in time. To prevent this from occurring, when the LSA 405 asks the MSA 410 to reserve a machine port, the MSA 410 "locks" the lot processing appointment when the lot 130 starts its final move.

But, sometimes, locked appointments do need to be shifted. For instance, assume two appointments are booked on the calendar for a particular process tool 115, and the first one is processing while the lot 130 for the second one is moving to the port of the process tool 115. The second appointment is locked because it is in its "final" move to the process tool 115. If the first appointment runs long and is to be expanded, the second one is first shifted to permit the first one to expand. Thus, the locked second appointment is shifted even though this is generally undesirable. In these cases, some special calendar shift routines designed specifically for handling locked appointments are used. The shifting of locked appointments is performed at the agent's discretion depending on circumstances. In the situation cited above, the locked second appointment most likely cannot be rescheduled elsewhere with an earlier start time.

Still other variations may be employed. For a further example, the automated semiconductor fabrication facility of FIG. 10 may be implemented in many variations. For instance, implementations may vary the degree of automation. Thus, in some alternative embodiments, the physical factory 1000 may be implemented without the AMHS 1060 or with a less than full AMHS 1060. The AEMS 1020 may schedule/process all activity on all machines, all activity on a subset of machines, or most activity on a subset (or all) of the machines. Implementations may also vary scheduling and processing options. For instance, MSAs may be employed without MPAs, and the level of human interaction may be more or less, depending on design constraints.

As a further example variation, the triggering events and/or time offsets may be filtered. In one particular embodiment, both the triggering event and the time offset are filtered on the basis of an attribute of the represented manufacturing domain. Consider an implementation in which lots 130 are assigned a priority, with higher priority lots being processed through the process flow faster than lower priority lots. In such an implementation the triggering event for a low priority lot 130 may be a transition in the appointment state of a current process operation to "near complete" with a relatively long time offset. On the other hand, for a high priority lot, the triggering event may be defined as entering the "active" state with a short time offset. Or, higher priority lots 130 may schedule further ahead, on average, than low priority lots, e.g., 5-7 process operations ahead instead 2-3 process operations. These filters can be built into the factory definition in the virtual factory 1010 so that the software agents 365 do not have to actively filter.

One consequence of filtering in this manner is that a given triggering event will have associated therewith more than one target process operation. Consider the scenario in which lots 130 are assigned different priorities. Assume that the transition in appointment state to "near complete" is a triggering event. That triggering event will have several target process operations associated therewith, e.g., one for each of the priorities that may be assigned to a lot 130. Which target process operation is actually scheduled will depend on the priority of the lot(s) 130 being processed, but multiple target process operations are nevertheless associated with the given triggering event.

In the illustrated embodiments, triggering events and time offsets are previously determined and stored in the virtual factory 1010. However, the invention is not limited. Alternative embodiments may determine triggering events and/or time offsets dynamically. In addition to these classes of objects set forth in Table 5 and Table 6, these embodiments will include a "schedule ahead strategy class" of helper objects. This class will be called by scheduling agents to determine a triggering event, or a time offset, or both, in light of the current factory state and factory definition stored in the virtual factory 1010. Some of these alternative embodiments will also include a "resolver" class of helper objects to resolve conflicts raised by the schedule ahead class of objects.

Furthermore, scheduling triggers, time offsets, targets, and filters for various alternative embodiments may be defined in different ways, with different objectives in mind. For example:

- one may explicitly specify these attributes for each process operation in a flow;
- another may automate this definition by executing one or more software classes against process flows, with these software classes calculating these attributes for each process operation in each flow (e.g., one software class may be used to define scheduling triggers and targets to ensure that tools are idle awaiting approaching rocket lots);
- yet another software class may calculate scheduling triggers for long running targets that are batch operations (e.g., calculating a percentage of the process time of the batch operation, defining which operation preceding the batch operation is that amount of cycle time away the batch operation and utilizing a "startProcessing" trigger with a calculated time offset);
- another software class may locate all photo operations that are followed by etch operations and define the etch operation to be scheduled prior to the photo process to support Automated Process Control ("APC") objectives where it is beneficial to know which specific etch tools is to be utilized and to be able to tune APC at photo with this knowledge; and
- still another software class may then be executed that resolves conflicts and defines a default trigger for each operation (e.g., a "nearCompleteProcessing" event of the previous operation).

Still other methodologies may used in conjunction with, or in lieu of, those set forth.

This concludes the detailed description. The particular embodiments disclosed above are illustrative only, as the invention may be modified and practiced in different but equivalent manners apparent to those skilled in the art having the benefit of the teachings herein. Note that further variations not discussed may be employed in still other embodiments. For instance, if a machine has idle time to sell it may want to advertise, or, individual machines may be assigned sales quotas as a goal to meet in utilization. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of scheduling ahead in a process flow for a manufacturing domain entity, comprising:
   - detecting an occurrence of a triggering event defined for a current process operation on the manufacturing domain entity; and
   - scheduling a target process operation upon expiration of a timed offset from the detection of the triggering event responsive to the detection thereof, the timed offset being defined for the target process operation scheduling.

2. The method of claim 1, further comprising defining the triggering event and the timed offset.

3. The method of claim 1, wherein detecting the triggering event includes:
   detecting an event; and
   determining whether the detected event is the triggering event.

4. The method of claim 1, wherein the triggering event comprises a change in an appointment state.

5. The method of claim 4, wherein the change in appointment state includes entering an active, active PM/Qual, processing, processing PM/Qual, near complete, or complete state.

6. The method of claim 1, wherein the triggering event comprises one of an equipment event and a factory state event.

7. The method of claim 1, wherein the target process operation comprises the immediately successive process operation.

8. The method of claim 1, wherein the target process operation is a plurality of process operations downstream from the current operation process.

9. The method of claim 1, wherein the timed offset is a zero offset.

10. The method of claim 1, wherein the timed offset is a non-zero offset.

11. The method of claim 1, further comprising setting an alarm for the expiration of the timed offset in order to initiate scheduling.

12. The method of claim 1, further comprising filtering at least one of the defined target process operation and the timed offset.

13. The method of claim 1, wherein filtering the defined target process operation and timed offset includes filtering based on an attribute of the manufacturing domain entity to which the event pertains.

14. The method of claim 2, further comprising defining a second triggering event associated with the current process operation, a second target process operation for the second triggering event, and a second timed offset from the detection of the second triggering event for scheduling the second target process operation.

15. The method of claim 1, further comprising:
   detecting an occurrence of a second triggering event defined for the current process operation; and
   scheduling a second target process operation upon expiration of the second timed offset from the detection of the second triggering event responsive to the detection of the second triggering event.

16. The method of claim 14, wherein the first target process operation precedes the second process operation in the process flow but the second triggering event is detected prior to the first triggering event.

17. The method of claim 16, wherein scheduling the second target process operation includes scheduling at least one feeder operation between the current process operation and the target process operation.

18. The method of claim 1, further comprising determining whether the triggering event occurred prior to initialization.

19. The method of claim 18, further comprising scheduling a respective target process operation for a triggering event occurring prior to initialization.

20. The method of 18, further comprising detecting a plurality of triggering events occurring prior to initialization.

21. The method of claim 19, further comprising scheduling a respective target process operation for each of the detected triggering events that occurred prior to initialization.

22. The method of claim 1, wherein the triggering event is associated with multiple target processing operations.

23. A computing system, comprising:
   a computing device;
   a bus system; and
   a storage communicating with the computing device over the bus system, the storage being encoded with instructions that, when executed by the computing device, performs a method for scheduling ahead in a process flow for a manufacturing domain entity, the method including:
      detecting an occurrence of a triggering event defined for a current process operation on the manufacturing domain entity; and
      scheduling a target process operation upon expiration of a timed offset from the detection of the triggering event responsive to the detection thereof, the timed offset being defined for the target process operation scheduling.

24. The computing system of claim 23, wherein the encoded method further comprises defining the triggering event and the timed offset.

25. The computing system of claim 23, wherein the timed offset is a non-zero offset.

26. The computing system of claim 23, wherein the encoded method further comprises filtering at least one of the defined target process operation and the timed offset.

27. The computing system of claim 23, wherein the triggering event in the encoded method is associated with multiple target processing operations.

28. A program storage medium encoded with instructions that, when executed, perform a method of scheduling ahead in a process flow for a manufacturing domain entity, the method comprising:
   detecting an occurrence of a triggering event defined for a current process operation on the manufacturing domain entity; and
   scheduling a target process operation upon expiration of a timed offset from the detection of the triggering event responsive to the detection thereof, the timed offset being defined for the target process operation scheduling.

29. The program storage medium of claim 28, wherein the encoded method further comprises defining the triggering event and the timed offset.

30. The program storage medium of claim 28, wherein the triggering event in the encoded method comprises one of a change in an appointment state, an equipment event, and a factory state event.

31. The program storage medium of claim 28, wherein the encoded method further comprises filtering at least one of the defined target process operation and the timed offset.

32. The program storage medium of claim 28, wherein the encoded method further comprises defining a second triggering event associated with the current process operation, a second target process operation for the second triggering event, and a second timed offset from the detection of the second triggering event for scheduling the second target process operation.

33. The program storage medium of claim 28, wherein the triggering event in the encoded method is associated with multiple target processing operations.

34. An automated processing environment, comprising:
a process flow capable of performing a plurality of process operations;
a plurality of manufacturing domain entities, a first subset of which perform the process operations on a second subset thereof, and
a computing system, including:
at least one of a management execution system and an automated material handling system for automating the process flow; and
a plurality of software components capable of scheduling ahead in the process flow for a respective one of the second subset of manufacturing domain entities, the method comprising:
detecting an occurrence of a triggering event defined for a current process operation on the manufacturing domain entity; and
scheduling a target process operation upon expiration of a timed offset from the detection of the triggering event responsive to the detection thereof, the timed offset being defined for the target process operation scheduling.

35. The method of claim 34, further comprising defining the triggering event and the timed offset.

36. The method of claim 34, wherein the triggering event comprises one of a change in an appointment state, an equipment event, and a factory state event.

37. The method of claim 34, further comprising filtering at least one of the defined target process operation and the timed offset.

38. A method of scheduling ahead in a process flow for a manufacturing domain entity, comprising:
for each of a plurality of target process operations to a current process operation, defining a respective triggering event and a respective timed offset for scheduling the respective target process operation;
detecting at least one of the triggering events; and
scheduling a respective target process operation for the detected triggering event on expiration of the timed offset from the detection responsive thereto.

39. The method of claim 38, wherein at least one of the triggering events comprises a change in an appointment state, an equipment event, and a factory state event.

40. The method of claim 38, further comprising filtering at least one of the defined target process operations and the respective timed offset therefor.

41. The method of claim 38, further comprising:
detecting a second triggering event; and
scheduling a second target process operation on expiration of the second timed offset from the detection of the second triggering event responsive to the detection of the second triggering event.

42. The method of claim 38, wherein one of the triggering events is associated with multiple target processing operations.

43. A computing apparatus, comprising
a computing device;
a bus system; and
a storage communicating with the computing device over the bus system, the storage being encoded with instructions that, when executed by the computing device, performs a method for scheduling ahead in a process flow for a manufacturing domain entity, the method including:
for each of a plurality of target process operations to a current process operation, defining a respective triggering event and a respective timed offset for scheduling the respective target process operation;
detecting at least one of the triggering events; and
scheduling a respective target process operation for the detected triggering event on expiration of the timed offset from the detection responsive thereto.

44. The computing apparatus of claim 43, wherein at least one of the triggering events comprises a change in an appointment state, an equipment event, and a factory state event.

45. The computing apparatus of claim 43, wherein the method further comprises filtering at least one of the defined target process operations and the respective timed offset therefor.

46. The computing apparatus of claim 43, wherein the method further comprises:
detecting a second triggering event; and
scheduling a second target process operation on expiration of the second timed offset from the detection of the second triggering event responsive to the detection of the second triggering event.

47. The computing apparatus of claim 43, wherein one of the triggering events is associated with multiple target processing operations.

48. A program storage medium encoded with instructions that, when executed by a computing device, perform a method of scheduling ahead in a process flow for a manufacturing domain entity, the method comprising:
for each of a plurality of target process operations to a current process operation, defining a respective triggering event and a respective timed offset for scheduling the respective target process operation;
detecting at least one of the triggering events; and
scheduling a respective target process operation for the detected triggering event on expiration of the timed offset from the detection responsive thereto.

49. The program storage medium of claim 48, wherein at least one of the triggering events comprises a change in an appointment state, an equipment event, and a factory state event.

50. The program storage medium of claim 48, wherein the encoded method further comprises filtering at least one of the defined target process operations and the respective timed offset therefor.

51. The program storage medium of claim 48, where in the encoded method further comprises:
detecting a second triggering event; and
scheduling a second target process operation on expiration of the second timed offset from the detection of the second triggering event responsive to the detection of the second triggering event.

52. The program storage medium of claim 48, wherein one of the triggering events is associated with multiple target processing operations.

53. An automated processing environment, comprising:
a process flow capable of performing a plurality of process operations;
a plurality of manufacturing domain entities, a first subset of which perform the process operations on a second subset thereof, and
a computing system, including:
at least one of a management execution system and an automated material handling system for automating the process flow; and a plurality of software components capable of scheduling ahead in the process flow for a respective one of the second subset of manufacturing domain entities, the method comprising:
   for each of a plurality of target process operations to a current process operation, defining a respective triggering event and a respective timed offset for scheduling the respective target process operation;
   detecting at least one of the triggering events; and
   scheduling a respective target process operation for the detected triggering event on expiration of the timed offset from the detection responsive thereto.

54. The method of claim 53, wherein at least one of the triggering events comprises a change in an appointment state, an equipment event, and a factory state event.

55. The method of claim 53, further comprising filtering at least one of the defined target process operations and the respective timed offset therefor.

56. The method of claim 53, further comprising:
   detecting a second triggering event; and
   scheduling a second target process operation on expiration of the second timed offset from the detection of the second triggering event responsive to the detection of the second triggering event.

57. The method of claim 53, wherein one of the triggering events is associated with multiple target processing operations.

\* \* \* \* \*